United States Patent
Jain et al.

(10) Patent No.: US 11,182,372 B1
(45) Date of Patent: Nov. 23, 2021

(54) TRACKING DATABASE PARTITION CHANGE LOG DEPENDENCIES

(71) Applicant: Amazon Technologies, Inc., Seattle, WA (US)

(72) Inventors: Vaibhav Jain, Seattle, WA (US); Vikas Jain, Bellevue, WA (US); Sharatkumar Nagesh Kuppahally, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 617 days.

(21) Appl. No.: 15/807,367

(22) Filed: Nov. 8, 2017

(51) Int. Cl.
  *G06F 16/21* (2019.01)
  *G06F 16/23* (2019.01)
  *G06F 11/14* (2006.01)

(52) U.S. Cl.
  CPC ...... *G06F 16/2358* (2019.01); *G06F 11/1464* (2013.01); *G06F 16/219* (2019.01); *G06F 2201/84* (2013.01)

(58) Field of Classification Search
  CPC ............. G06F 16/2308; G06F 16/9027; G06F 16/2282; G06F 16/278; G06F 2201/84; G06F 16/219; G06F 16/2358
  See application file for complete search history.

(56) References Cited

U.S. PATENT DOCUMENTS

| | | |
|---|---|---|
| 5,586,264 A | 12/1996 | Belknap et al. |
| 5,615,364 A | 3/1997 | Marks |
| 5,692,177 A | 11/1997 | Miller |
| 5,768,527 A | 6/1998 | Zhu et al. |
| 5,813,009 A | 9/1998 | Johnson et al. |
| 5,842,222 A | 11/1998 | Nishimura et al. |
| 5,991,772 A | 11/1999 | Doherty et al. |
| 6,085,200 A | 7/2000 | Hill et al. |
| 6,161,109 A | 12/2000 | Matamoros et al. |

(Continued)

FOREIGN PATENT DOCUMENTS

| | | |
|---|---|---|
| CN | 104750773 | 7/2015 |
| JP | 2014141343 | 8/2014 |
| WO | 2012168365 | 12/2012 |

OTHER PUBLICATIONS

Amazon Web Services, "Amazon DynamoDB Developer Guide", API Version, Aug. 10, 2012, pp. 1-793.

(Continued)

*Primary Examiner* — Marcin R Filipczyk
(74) *Attorney, Agent, or Firm* — Robert C. Kowert; Kowert, Hood, Munyon, Rankin & Goetzel, P.C.

(57) ABSTRACT

Various systems and methods of tracking database partition change log dependencies are described herein. A system is disclosed herein, according to some embodiments. A change log for a database partition of the plurality of database partitions is stored to a log store. An indication that a split of the database partition into two or more child database partitions has occurred is received. Responsive to the split of the database partition, the change log is split into two or more corresponding child change logs. A portion of the change log is deleted responsive to a determination that a respective complete snapshot is stored for each child database partition corresponding to a child change log of the change log and a determination that a retention window for the portion of the change log has passed.

20 Claims, 10 Drawing Sheets

(56) References Cited

U.S. PATENT DOCUMENTS

| | | |
|---|---|---|
| 6,199,074 B1 | 3/2001 | Kern et al. |
| 6,272,598 B1 | 8/2001 | Arlitt et al. |
| 6,374,266 B1 | 4/2002 | Shnelvar |
| 6,374,267 B1 | 4/2002 | Tam |
| 6,397,351 B1 | 5/2002 | Miller et al. |
| 6,505,216 B1 | 1/2003 | Schutzman et al. |
| 6,651,077 B1 | 11/2003 | East et al. |
| 6,728,879 B1 | 4/2004 | Atkinson |
| 7,096,392 B2 | 8/2006 | Sim-Tang |
| 7,328,226 B1 | 2/2008 | Karr et al. |
| 7,330,859 B2 | 2/2008 | Gupta et al. |
| 7,343,356 B2 | 3/2008 | Prahlad et al. |
| 7,353,241 B2 | 4/2008 | Erlingsson |
| 7,373,364 B1 | 5/2008 | Chapman |
| 7,386,586 B1 | 6/2008 | Headley et al. |
| 7,509,358 B1 | 3/2009 | Bingham et al. |
| 7,546,428 B1 | 6/2009 | McAndrews et al. |
| 7,565,661 B2 | 7/2009 | Sim-Tang |
| 7,606,481 B2 | 10/2009 | Kuruma |
| 7,606,841 B1 | 10/2009 | Ranade |
| 7,606,844 B2 | 10/2009 | Kottomtharayil |
| 7,653,668 B1 | 1/2010 | Shelat et al. |
| 7,657,781 B1 | 2/2010 | Dixon et al. |
| 7,668,876 B1 | 2/2010 | Kulkarni |
| 7,680,843 B1 | 3/2010 | Panchbudhe et al. |
| 7,689,597 B1 | 3/2010 | Bingham et al. |
| 7,716,186 B2 | 5/2010 | Cannon et al. |
| 7,730,034 B1 | 6/2010 | Deflaux et al. |
| 7,792,802 B1 | 9/2010 | Rao |
| 7,802,001 B1 | 9/2010 | Petry et al. |
| 7,921,077 B2 | 4/2011 | Ting et al. |
| 7,949,662 B2 | 5/2011 | Farber et al. |
| 8,041,679 B1 | 11/2011 | Beatty et al. |
| 8,065,278 B2 | 11/2011 | Beatty et al. |
| 8,078,582 B2 | 12/2011 | Wang et al. |
| 8,095,745 B1 | 1/2012 | Schmidt et al. |
| 8,108,343 B2 | 1/2012 | Wang et al. |
| 8,117,164 B2 | 2/2012 | Spektor et al. |
| 8,161,255 B2 | 4/2012 | Anglin et al. |
| 8,166,263 B2 | 4/2012 | Prahlad et al. |
| 8,190,960 B1 | 5/2012 | Bahadur et al. |
| 8,200,615 B2 | 6/2012 | Halliday |
| 8,244,679 B1 | 8/2012 | Bilsborough |
| 8,255,739 B1 | 8/2012 | Chatterjee et al. |
| 8,332,842 B2 | 12/2012 | Bauer et al. |
| 8,359,596 B2 | 1/2013 | Kobayashi et al. |
| 8,364,648 B1 | 1/2013 | Sim-Tang |
| 8,386,631 B2 | 2/2013 | Nilsson et al. |
| 8,386,771 B2 | 2/2013 | Baker et al. |
| 8,463,633 B2 | 6/2013 | Jung et al. |
| 8,478,726 B2 | 7/2013 | Habermann et al. |
| 8,488,661 B2 | 7/2013 | Menon et al. |
| 8,510,270 B2 | 8/2013 | Pareek et al. |
| 8,521,695 B2 | 8/2013 | Zwilling et al. |
| 8,533,478 B2 | 9/2013 | Aguilera et al. |
| 8,543,746 B2 | 9/2013 | Roever |
| 8,548,945 B2 | 10/2013 | Dwyer et al. |
| 8,566,286 B1 | 10/2013 | Hawton et al. |
| 8,572,091 B1 | 10/2013 | Sivasubramanian et al. |
| 8,612,700 B1 | 12/2013 | Armstrong et al. |
| 8,626,709 B2 | 1/2014 | Isaacson et al. |
| 8,635,187 B2 | 1/2014 | Beatty et al. |
| 8,650,155 B2 | 2/2014 | Corbin et al. |
| 8,676,752 B2 | 3/2014 | Kundu et al. |
| 8,712,970 B1 | 4/2014 | Sim-Tang |
| 8,719,362 B2 | 5/2014 | Wu et al. |
| 8,725,934 B2 | 5/2014 | Batwara et al. |
| 8,805,810 B2 | 8/2014 | Lucas |
| 8,818,954 B1 | 8/2014 | Bergant et al. |
| 8,825,938 B1 | 9/2014 | Ellard et al. |
| 8,892,938 B1 | 11/2014 | Sundaram et al. |
| 9,183,200 B1 | 11/2015 | Liu et al. |
| 9,235,606 B1 | 1/2016 | Mooney et al. |
| 9,552,382 B2 | 1/2017 | Barrus |
| 9,558,078 B2 | 1/2017 | Farlee et al. |
| 9,703,640 B2 | 7/2017 | Beatty et al. |
| 9,720,620 B1 | 8/2017 | Wei et al. |
| 9,720,991 B2 | 8/2017 | Kritchko et al. |
| 9,785,510 B1 | 10/2017 | Madhavarapu et al. |
| 10,162,715 B1 | 12/2018 | MacDonald McAlister et al. |
| 10,754,844 B1* | 8/2020 | Jain .................... G06F 16/2358 |
| 2002/0114341 A1 | 8/2002 | Sutherland et al. |
| 2002/0152299 A1 | 10/2002 | Traversat et al. |
| 2003/0220935 A1 | 11/2003 | Vivian et al. |
| 2004/0215803 A1 | 10/2004 | Traversat et al. |
| 2005/0022213 A1 | 1/2005 | Yamagami |
| 2005/0188256 A1 | 8/2005 | Stager et al. |
| 2005/0251540 A1 | 11/2005 | Sim-Tang |
| 2006/0020634 A1 | 1/2006 | Huras et al. |
| 2006/0047931 A1* | 3/2006 | Saika ................... G06F 11/1451 |
| | | 711/162 |
| 2006/0053262 A1 | 3/2006 | Prahlad et al. |
| 2006/0100972 A1 | 5/2006 | Chianese et al. |
| 2006/0253600 A1 | 11/2006 | Hannuksela |
| 2007/0027937 A1 | 2/2007 | McGrattan et al. |
| 2007/0162516 A1 | 7/2007 | Thiel et al. |
| 2007/0250835 A1 | 10/2007 | Kobayashi et al. |
| 2007/0276884 A1 | 11/2007 | Hara et al. |
| 2007/0288853 A1 | 12/2007 | Romem et al. |
| 2007/0288530 A1 | 12/2007 | Romem et al. |
| 2008/0294696 A1 | 11/2008 | Frandzel |
| 2009/0125362 A1 | 5/2009 | Reid et al. |
| 2009/0238262 A1 | 9/2009 | Miceli |
| 2009/0271605 A1 | 10/2009 | Park et al. |
| 2010/0005259 A1 | 1/2010 | Prahlad et al. |
| 2010/0257138 A1 | 10/2010 | Wang et al. |
| 2010/0257140 A1 | 10/2010 | Davis et al. |
| 2010/0262717 A1 | 10/2010 | Critchley et al. |
| 2010/0274762 A1 | 10/2010 | Murphy et al. |
| 2011/0137899 A1* | 6/2011 | Lyon-Smith ........ G06F 16/9027 |
| | | 707/737 |
| 2011/0141882 A1 | 6/2011 | Rieschl et al. |
| 2011/0178985 A1 | 7/2011 | San Martin Arribas et al. |
| 2011/0258239 A1 | 10/2011 | Petrocelli |
| 2012/0166401 A1 | 6/2012 | Li et al. |
| 2012/0209817 A1 | 8/2012 | Golab et al. |
| 2012/0221715 A1 | 8/2012 | Hamada |
| 2012/0250682 A1 | 10/2012 | Vincent et al. |
| 2012/0265890 A1 | 10/2012 | Carlson et al. |
| 2012/0303999 A1 | 11/2012 | Calder et al. |
| 2012/0317274 A1 | 12/2012 | Richter et al. |
| 2012/0317583 A1 | 12/2012 | Corbea et al. |
| 2013/0018853 A1 | 1/2013 | Jayaraman et al. |
| 2013/0073724 A1 | 3/2013 | Parashar et al. |
| 2013/0124466 A1 | 5/2013 | Naidu et al. |
| 2013/0124483 A1 | 5/2013 | Furuhashi et al. |
| 2013/0132604 A1 | 5/2013 | Cohen et al. |
| 2013/0151683 A1 | 6/2013 | Jain et al. |
| 2013/0152047 A1 | 6/2013 | Moorthi et al. |
| 2013/0166556 A1 | 6/2013 | Baeumges et al. |
| 2013/0262388 A1 | 10/2013 | Sorenson et al. |
| 2013/0290642 A1 | 10/2013 | Huang et al. |
| 2013/0346366 A1 | 12/2013 | Ananthanarayanan et al. |
| 2014/0019413 A1 | 1/2014 | Braam et al. |
| 2014/0019421 A1 | 1/2014 | Jagadeesan |
| 2014/0046906 A1 | 2/2014 | Patiejunas et al. |
| 2014/0047263 A1 | 2/2014 | Coatney et al. |
| 2014/0279905 A1 | 9/2014 | Muniswamy-Reddy et al. |
| 2014/0324785 A1 | 10/2014 | Gupta et al. |
| 2014/0358844 A1 | 12/2014 | Mundlapudi et al. |
| 2015/0172412 A1 | 6/2015 | Escriva et al. |
| 2016/0077674 A1 | 3/2016 | Pundir et al. |
| 2016/0077923 A1 | 3/2016 | Zhang et al. |
| 2016/0350392 A1* | 12/2016 | Rice ........................ G06F 16/27 |
| 2017/0093755 A1* | 3/2017 | Pol .......................... G06F 16/23 |
| 2019/0095455 A1* | 3/2019 | Barreto ............... G06F 11/1446 |

OTHER PUBLICATIONS

Amazon Web Services, "Amazon DynamoDB Streams API Reference", API Version, Aug. 10, 2012, pp. 1-29.
U.S. Appl. No. 14/077,173, filed Nov. 11, 2013, Marvin Michael Theimer et al.

(56) References Cited

OTHER PUBLICATIONS

U.S. Appl. No. 14/077,171, filed Nov. 11, 2013, Marvin Michael Theimer et al.
U.S. Appl. No. 14/136,624, filed Dec. 20, 2013, Marvin Michael Theimer et al.
U.S. Appl. No. 14/136,645, filed Dec. 20, 2013, Marvin Michael Theimer et al.
U.S. Appl. No. 14/077,167, filed Nov. 11, 2013, Marvin Michael Theimer et al.
U.S. Appl. No. 14,077,162, filed Nov. 11, 2013, Marvin Michael Theimer et al.
U.S. Appl. No. 14/316,674, filed Jun. 26, 2014, Allan Henry Vermeulen et al.
U.S. Appl. No. 14/537,788, filed Nov. 10, 2014, Lei Ye et al.
International Search Report and Written Opinion From PCT/US2014/065057, dated Feb. 20, 2015, Amazon Technologies, Inc., pp. 1-13.
Alejandro Abdelnur, "Oozie Specification, a Hadoop Workflow System," Oct. 8, 2010, retrieved from http://rvs.github.com/oozie/release/2.2.1/WorkflowFunctionalSpec.html on Feb. 11, 2013, pp. 1-37.
Ani I Pillai and Alejandro Abdelnur, "Oozie Coordinator Specification," Oct. 8, 2010., retrieved from http://rvs.github.com/oozie/releases/2 2.1 /CoordinatorFunctionaiSpec.html on Feb. 11, 2013 pp. 1-43.
"Oozie-Design," retrieved from http://rvs.github.com/oozie/design.html on Feb. 11, 2013. pp. 1-2.
"Quartz Scheduler 2.1.x Documentation," retrieved from http://quartz-scheduler.org/files/documentation/Quartz-2.1.x-Documentation.pdfon Feb. 11, 2013. pp. 1-140.
Apache Kafka, "A High-Throughput Distributed Messaging System", pp. 1-42, Oct. 8, 2013.
Amazon Web Services, "Amazon Simple Queue Service (Amazon SQS)", pp. 1-5, Oct. 8, 2013.
Apache Software Foundation, "Hadoop Streaming", pp. 7-17, 2008.
SIGMOD Record, "Parallel Data Processing with MapReduce: A Survey", Kyong-Ha Lee, et al., pp. 11-20, Dec. 2011.
Splunk Inc., "Splunk for Application Management", pp. 1-2, 2012.
Github, "Rationale", pp. 1-2, Oct. 8, 2013.
Github, "Tutorial", pp. 1-8, Oct. 8, 2013.
U.S. Appl. No. 13/764,716, filed Feb. 11, 2013, Kathryn Marie Shih et al.
U.S. Appl. No. 13/764,711, filed Feb. 11, 2013, Kathryn Marie Shih et al.
U.S. Appl. No. 61/738,967, filed Dec. 18, 2012, Kathryn Marie Shih et al.
U.S. Appl. No. 13/465,944, filed May 7, 2012, Jonathan 8. Corley et al.
U.S. Appl. No. 13/465,978, filed May 7, 2012, Jonathan 8. Corley et al.
U.S. Appl. No. 13/476,987, filed May 21, 2012, Jacob Gabrielson et al.
Pierre Dorion, IBM Tivoli Storage Manager backup software tips, Apr. 2009, http://searchdatabackup.techtarget.com/tip/IBMTivoli-Storage-Manager-backup-software-tips.
Lascon, TSM Hints and Tips on Restores, Nov. 10, 2012, LasCon Storage, http://www.lascon.co.uk/tsm-restores.php.
International Search Report and Written Opinion from PCT/US14/65052, dated Feb. 20, 2015, Amazon Technologies, Inc., pp. 1-11.
U.S. Appl. No. 14/753,475, filed Jun. 29, 2015, Allan Henry Vermeulen, et al.
U.S. Appl. No. 14/753,484, filed Jun. 29, 2015, John Michael Morkel, et al.
U.S. Appl. No. 14/753,495, filed Jun. 29, 2015, Timothy Daniel Cole, et al.
U.S. Appl. No. 14/753,505, filed Jun. 29, 2015, Allan Henry Vermeulen, et al.
U.S. Appl. No. 14/482,668, filed Sep. 10, 2014, Allan Henry Vermuelen.
U.S. Appl. No. 14/482,661, filed Sep. 10, 2014, Allan Henry Vermeulen.
U.S. Appl. No. 14/491,454, filed Sep. 19, 2014, Allan Henry Vermeulen.
U.S. Appl. No. 14/491,371, filed Sep. 19, 2014, Allan Henry Vermeulen.
U.S. Appl. No. 14/491,444, filed Sep. 19, 2014, Allan Henry Vermeulen.
U.S. Appl. No. 14/316,630, filed Jun. 26, 2014, Allan Henry Vermeulen.
U.S. Appl. No. 14/316,622, filed Jun. 26, 2014, Allan Henry Vermeulen.
U.S. Appl. No. 14/316,619, filed Jun. 26, 2014, Allan Henry Vermeulen.
U.S. Appl. No. 14/231,077, filed Mar. 31, 2014, Jacob A. Strauss.
U.S. Appl. No. 14/230,378, filed Mar. 31, 2011, Jacob A. Strauss.
Sergio Almeida, et al., "Chain Replication: a Causal + Consistent Datastore based on Chain Replication", Apr. 15-17, 2013, pp. 85-98.
Scott Lystig Fritchie, "Chain Replication in Theory and in Practice", Sep. 30, 2010, pp. 1-11.
Robbert Van Renesse, et al., "Chain Replication for Supporting High Throughput and Availability", 2004, pp. 91-104.
U.S. Appl. No. 15/717,614, filed Sep. 27, 2017, Vaibhav Jain.
U.S. Appl. No. 15,717,606, filed Sep. 27, 2017, Vaibhav Jain.
"Cloud Spanner: TrueTime and External Consistency", Retrieved from URL: https://cloud.google.com/spanner/docs/true-time-external-consistency on Feb. 28, 2018, pp. 1-6.
Randall Hunt, "Keeping Time with Amazon Time Sync Service", AWS News Blog, Retrieved the URL: https://aws.amazon.com/blogs/aws/keeping-time-with-amazon-time-sync-service on Feb. 28, 2018, pp. 1-3.
Barbara Liskov, "Practical Uses of Synchronized Clocks in Distributed Systems", ACM, copyright 1991 ACM, pp. 1-9.
James C. Corbrett, et al., "Spanner: Google's Globally-Distributed Database", Published in the Proceeding of OSDI 2012, 2012, pp. 1-14.
Friedemann Mattern, "Virtual Time and Global States of Distributed Systems", In the Proceedings of the International Workshop on Parallel and Distributed Algorithms, Oct. 1988, pp. 120-134.
U.S. Appl. No. 15/918,920, filed Mar. 12, 2018, Tate Andrew Certain, et al.
"Capturing Table Activity with DynamoDB Streams", dated Oct. 19, 2018, pp. 1-8.
Randall Hunt "New—Amazon DynamoDB Continuous Backups and Points-In-Time Recpvery", Mar. 26, 2018, pp. 1-9.
"Appendix E. Realese Notes", (PostgreSQL: Documentation: 10: E.144. Release 9.0.7), Oct. 19, 2018, pp. 1-4.
"PostgreSQL: THe World's Most Advanced Open Source Relational Database", (https://www.postgresql.org), dated Oct. 19, 2018, pp. 1-10.
U.S. Appl. No. 14/977,472, filed Dec. 21, 2015, Akshat Vig.
U.S. Appl. No. 15/676,933, filed Aug. 14, 2017, Elizabeth Sanocki.
U.S. Appl. No. 15/728,271, filed Oct. 9, 2017, Pradeep Jnana Madhavarapu.
U.S. Appl. No. 14/977,453, filed Dec. 21, 2015, Yan Valerie Leshinsky.
U.S. Appl. No. 16/213,109, filed Dec. 21, 2018, Grant Alexander MacDonald McAlister.
U.S. Appl. No. 15/920,207, filed Mar. 13, 2018, Akshat Vig.
U.S. Appl. No. 16/101,153, filed Aug. 10, 2018, Akshat Vig.
U.S. Appl. No. 15/920,193, filed Mar. 13, 2018, Akshat Vig.
U.S. Appl. No. 16/197,033, filed Nov. 20, 2018, Rachit Jain.
U.S. Appl. No. 16/231,109, filed Dec. 21,2018, Grant Alexander MacDonald McAlister.

* cited by examiner

TRACKING DATABASE PARTITION CHANGE LOG DEPENDENCIES

BACKGROUND

Database systems may utilize multiple partitions of storage systems, such as hard drives or solid state drives, to store databases. Over time, a database may become partitioned on the storage systems such that data of the database becomes segmented from other data within the same database. The database may be tracked utilizing change logs in order to track incremental changes over time. Backup systems may utilize the change logs in order to efficiently store and manage backups of the database without using excess storage space.

When a database partition becomes further partitioned or split into child database partitions, the change log for the database partition prior to the split is still used when tracking changes. A point-in-time restoration of the database partition or the child database partitions may be dependent on the change log prior to the split.

Figure 1:
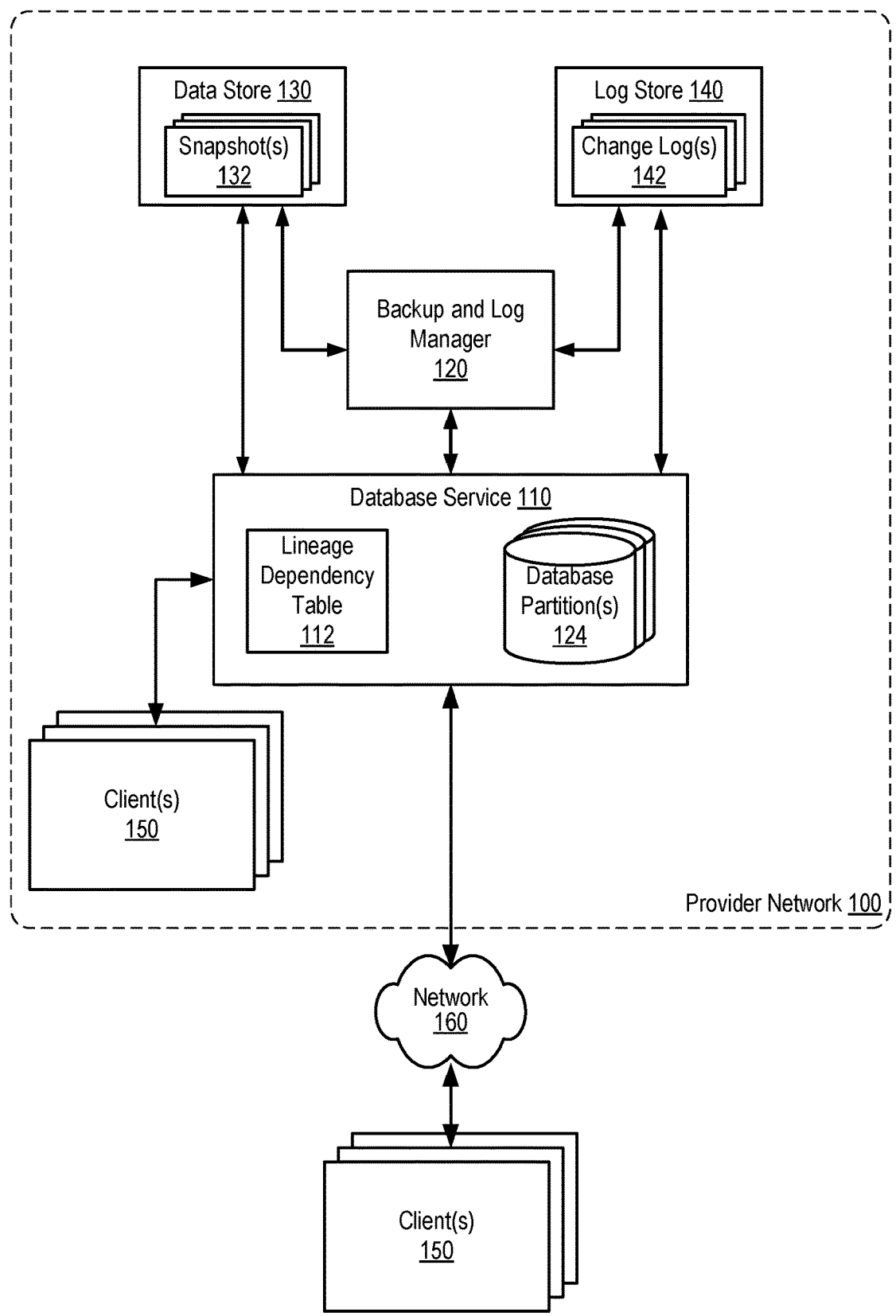
FIG. 1 is a logical block diagram illustrating a provider network that implements a database service, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of systems and processes that track database partition dependencies are described herein. In some aspects of the invention, a system is disclosed herein. The system includes a database service having a plurality of database partitions to store a database. The system also includes a log store to store a plurality of change logs corresponding to the plurality of database partitions for the database. The system further includes one or more computing devices having one or more processors and a memory. The memory stores instructions that, when executed by the one or more processors, cause the one or more processors to receive an indication that a split of a database partition of the plurality of database partitions into two or more child database partitions has occurred. The instructions also cause the one or more processors to split, responsive to the split of the database partition, a change log for the database partition into two or more corresponding child change logs, wherein the two or more child change logs are stored to the log store. The instructions further cause the one or more processors to delete a portion of the change log responsive to a determination that a respective complete snapshot is stored for each child database partition corresponding to a child change log of the change log has a determination that a retention window for the portion of the change log has passed.

In another aspect of the invention, a method is disclosed herein. The method includes storing a change log for a database partition, where the change log indicates changes made to the database partition. The method also includes splitting, responsive to a split of the database partition into two or more child database partitions, the change log into two or more corresponding child change logs. The method further includes deleting a portion of the change log responsive to a determination that a complete snapshot is stored for each child database partition corresponding to a child change log of the change log has a determination that a retention window for the portion of the change log has passed.

In yet another aspect of the invention, a computer-readable storage medium storing instructions is disclosed herein. The instructions, when executed by one or more processors, cause the one or more processors to store a change log for a database partition, wherein the change log indicates changes made to the database partition. The instructions also cause the one or more processors to split, responsive to a split of the database partition into two or more child database partitions, the change log into two or more corresponding child change logs. The instructions further cause the one or more processors to delete a portion of the change log responsive to a determination that a complete snapshot is stored for each child database partition corresponding to a child change log of the change log has a determination that a retention window for the portion of the change log has passed.

A method for deleting at least a portion of a change log for a database partition is disclosed herein, according to some embodiments. The method includes identifying a portion of a change log for possible deletion. The method further includes determining whether a reference counter for a corresponding database partition equals zero. Based on a determination that the reference counter is nonzero, the method may end. Based on a determination that the reference counter is equal to zero, the method may continue. The method continues by determining whether a retention window for the portion of the change log has passed. Based on a determination that the retention window for the portion of the change log has not passed, the method may end. Based on a determination that the retention window has elapsed, the method continues. The method concludes by deleting the portion of the change log.

A method for tracking dependencies for change logs of database partitions is disclosed herein, according to some embodiments. The method includes receiving an indication a database partition has split into two or more child database partitions. The method includes determining whether another parent partition for the database partition exists within a retention window. Based on a determination that another parent partition is found, the method also includes incrementing a reference counter for the database partition corresponding to a quantity of the two or more database partitions. Based on a determination that no other parent partitions are found for the database partition, the method may conclude.

A method for tracking dependencies for change logs of database partitions is disclosed herein, according to some embodiments. The method includes receiving an indication that a complete snapshot of a database partition is saved. The method also includes determining whether another parent partition for the database partition exists. Based on a determination that a parent partition is found, the method further includes decrementing a corresponding reference counter for the parent partition. Based on a determination that no other parent partitions are found for the child database partition, the method may conclude by returning to other functions of the database service.

FIG. 1 is a logical block diagram illustrating a provider network that implements a database service, according to some embodiments. Provider network 100 may be a private or closed system, in one embodiment, or may be set up by an entity such as a company or a public sector organization to provide one or more services (such as various types of cloud-based storage) accessible via the Internet and/or other networks to clients 150, in another embodiment. In one embodiment, provider network 100 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 100. In one embodiment, provider network 100 may implement various computing resources or services, such as a database service 110 or other data processing (e.g., relational or non-relational (NoSQL) database query engines, map reduce processing, data warehouse, data flow processing, and/or other large scale data processing techniques), data storage services (e.g., an object storage service, block-based storage service, or data storage service that may store different types of data for centralized access), virtual compute services, and/or any other type of network based services (which may include various other types of storage, processing, analysis, communication, event handling, visualization, and security services not illustrated).

In some embodiments, the provider network 100 may include a backup and log manager 120 configured to handle or manage backups of databases that are stored with or maintained by the database service 110. The backups may be maintained by one or more data storage services. In some embodiments, the data storage services may include a data store 130 and a log store 140. The data store 130 may be configured to store complete backups of partitions of the database 124 at a particular point-in-time as snapshots 132. For example, a particular snapshot 132 stored at the data store 130 may be generated at a particular point-in-time such that the data in the particular snapshot 132 is at the state in which the database existed at that particular point-in-time. In other embodiments, the database service 110 may be configured to store current or active data for the database such that data of the partition of the database 124 is the most recent version of the data. The log store 140 may be configured to store logs 142 indicating changes, mutations or events that occur with respect to the database or any data corresponding to the database managed by the database service 110.

In various embodiments, the components illustrated in FIG. 1 may be implemented directly within computer hardware, as instructions directly or indirectly executable by computer hardware (e.g., a microprocessor or computer system), or using a combination of these techniques. For example, the components of FIG. 1 may be implemented by a system that includes a number of computing nodes (or simply, nodes), in one embodiment, each of which may be similar to the computer system embodiment illustrated in FIG. 10 and described below. In one embodiment, the functionality of a given system or service component (e.g., a component of database service 110) may be implemented by a particular node or may be distributed across several nodes. In some embodiments, a given node may implement the functionality of more than one service system component (e.g., more than one data store component, such as data store 130 or log store 140).

Database service 110 may include various types of database services, in one embodiment, (both relational and non-relational) for storing, querying, and updating data. Such services may be enterprise-class database systems that are highly scalable and extensible. In one embodiment, queries may be directed to a database in database service 110 that is distributed across multiple physical resources (e.g., computing nodes or database nodes), and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service 110 may also be any of various types of data processing services to perform different functions (e.g., query or other processing engines to perform functions such as anomaly detection, machine learning, data lookup, or any other type of data processing operation). For example, in at least one embodiment, database service 110 may include a map reduce service that creates clusters of database nodes that implement map reduce functionality over data stored in one of data storage services (e.g., data store 130). Various other distributed processing architectures and techniques may be implemented by database service 110 (e.g., grid computing, sharding, distributed hashing, etc.) in another embodiment.

In one embodiment, clients 150 may encompass any type of client configurable to submit network-based requests to provider network 100 via network 160, including requests for database service 110 (e.g., to query a database managed by the database service 110) or data storage service(s) (e.g., a request to create, read, write, obtain, or modify data in data storage service(s), etc.). For example, in one embodiment a given client 150 may include a suitable version of a web browser, or may include a plug-in module or other type of code module configured to execute as an extension to or within an execution environment provided by a web browser. Alternatively, in a different embodiment, a client 150 may encompass an application such as a database application (or user interface thereof), a media application, an office application or any other application that may make use of storage resources in data storage service(s) to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 150 may be an application configured to interact directly with provider network 100, in one embodiment. In one embodiment, client 150 may be configured to generate network-based services requests according to a Representational State Transfer (REST)-style network-based services architecture, a document- or message-based network-based services architecture, or another suitable network-based services architecture.

In one embodiment, a client 150 may be configured to provide access to provider network 100 to other applications in a manner that is transparent to those applications. For example, client 150 may be configured to integrate with a database on database service 110. In such an embodiment, applications may not need to be modified to make use of the storage system service model. Instead, the details of interfacing to the database service 110 may be coordinated by client 150.

The clients 150 may communicate with the database service 110 from within the provider network 100, in some embodiments. For example, the clients 150 may be implemented on computing nodes of a computing service offered by the provider network 100. The clients 150 may convey network-based services requests to and receive responses from provider network 100 via network 160, in one embodiment. In one embodiment, network 160 may encompass any suitable combination of networking hardware and protocols necessary to establish network-based-based communications between clients 150 and provider network 100. For example, network 160 may encompass the various telecommunications networks and service providers that collectively implement the Internet. In one embodiment, network 160 may also include private networks such as local area networks (LANs) or wide area networks (WANs) as well as public or private wireless networks. For example, both a given client 150 and provider network 100 may be respectively provisioned within enterprises having their own internal networks. In such an embodiment, network 160 may include the hardware (e.g., modems, routers, switches, load balancers, proxy servers, etc.) and software (e.g., protocol stacks, accounting software, firewall/security software, etc.) necessary to establish a networking link between given client 150 and the Internet as well as between the Internet and provider network 100. It is noted that in one embodiment, clients 150 may communicate with provider network 100 using a private network rather than the public Internet.

The clients 150 may send a request to perform an operation to respective databases managed by the database service 110. For example, a given client 150 may send a PUT (or SET) command and corresponding data to request that the data be stored in the database at the data store 130. In another example, a given client 150 may send a CHANGE (or UPDATE) command and corresponding data to request that some data existing in the database at the data store 130 be changed based on the sent data. In yet another example, a given client 150 may send a DELETE (or REMOVE) command and identify data to request that the data existing in the database at the data store 130 be deleted or removed from the database and the data store 130. In other embodiments, a given client 150 may provide another command to perform some operation to the data stored in the database at the data store 130.

In some embodiments, responsive to the request to perform the operation, the database service 110 may direct an event to perform the operation causing one or more changes to data stored in a partition of the database 124. For example, the database service 110 may store new data in the partition of the database 124 in response to the PUT command received from the given client 150. As another example, the database service 110 may change some data stored in the partition of the database 124 in response to the CHANGE command received from the given client 150. As yet another example, the database service 110 may delete some data from the partition of the database 124 in response to the DELETE command received from the given client 150.

The database service 110 may be configured to maintain a backup system for partitions of databases 124 managed by the database service 110. In some embodiments, the backup system may perform backups for single partitions of the databases or single partition databases. In other embodiments, the backup system may perform backups for multiple partitions of the databases 124. The backup system may include a backup and log manager 120 configured to generate and manage backups or snapshots 132 of partitions of the databases 124 stored at in storage services of the database service 110. The backup and log manager 120 may generate a complete backup of a partition of the database 124 (e.g., a snapshot) by saving a complete copy of the partition of the database 124 to the data store 130. In some embodiments, the backup and log manager 120 may request a full snapshot from the database service 110. The full snapshot may be interchangeably referred to as the complete snapshot herein. The snapshot 132 may have parity with the partition of the database 124 as it exists in the database service 110 at a respective time of creation. For example, at time $T_0$ when the snapshot is generated, the snapshot may be a complete or full copy of the partition of the database 124, such that the snapshot represents the state of the partition of the database 124 at time $T_0$. As an example, at a later time $T_1$, the snapshot may be out-of-date based on one or more changes to the database resulting from one or more events at the database service 110. In some embodiments, the database service may have a high workload or otherwise be delayed in fulfilling the request for the full snapshot. Thus, the backup and log manager 120 may defer to a log-based snapshot as an alternative method to generate the full snapshot when the database service is determined to be unable to fulfill the request.

The database service 110 may partition existing partitions of the databases 124. In some embodiments, the database service 110 may execute a partition operation or a split operation to a given partition of a given database causing the given partition to split into two or more child partitions. Data managed by or stored in the given partition may be divided by the split operation into the two or more child partitions. The split may be indicated in the change log. In some embodiments, the given partition may be implemented on a first node, and the two or more child partitions may be implemented on two or more other nodes. In other embodiments, the given partition and the two or more child partitions may be implemented on the same node.

The database service 110 may generate a lineage dependency table for the partitions of the database 124, such as a lineage dependency table 112. In some embodiments, the lineage dependency table 112 may describe or indicate a lineage dependency table that indicates respective parent partitions and respective child partitions for a given partition of the partitions of the database 124. In other embodiments, the lineage dependency table 112 may indicate a hierarchy of each of the partitions. For example, the hierarchy may be conceptualized as a tree structure that connects partitions to respective parent and child partitions. In some embodiments, the backup and log manager 120 may traverse the lineage dependency table 112 to identify a lineage of a given partition of the partitions of the database 124. For example, the backup and log manager 120 may start at the given partition and utilize the lineage dependency table 112 to identify each parent and child partition of the given partition. In some embodiments, the backup and log manager 120 may save the determined lineage to metadata for the given partition.

The lineage dependency table 112 may include respective reference counters for respective partitions of the partitions of the database 124. In some embodiments, the lineage dependency table 112 may be stored as a table with rows for respective parent partitions and respective child partitions. In some embodiments, the respective reference counters may be stored in the table for the lineage dependency table 112. In other embodiments, the respective reference counters may be stored in a separate table from the lineage dependency table 112.

A change log 142 may indicate the one or more changes to the database over a period of time or sequence of events. For example, the change log 142 may indicate that data was added, changed or deleted from the database in a period of time. The change log 142 may be stored at the log store 140. The log store 140 may be accessible to the database service 110 and the backup and log manager 120. In some embodiments, the database service 110 may generate or update a log segment in response to an event at the database. For example, the database service 110 may indicate in the log segment that the event occurred, and some data in the database has changed. The log segment may include metadata indicating a sequence start identifier, a sequence end identifier, a time start identifier, a time end identifier, one or more checksums, a previous cumulative size of the change log, a lineage of the log segment, or any combination thereof. The sequence start identifier may indicate a sequence number for a first event in a sequence of events that is logged in the log segment. The sequence end identifier may indicate a sequence number for a last event in the sequence of events that is logged in the log segment. The time start identifier may indicate a timestamp for the first event in the sequence of events that is logged in the log segment. The time end identifier may indicate a timestamp for the last event in the sequence of events that is logged in the log segment. The one or more checksums may correspond to the data in the partition of the database 124, the log segment, etc. The one or more checksums may be used by the backup and log manager 120 or the database service 110 to determine whether application of at least a portion of the log segment or the change log to the database has resulted in the correct data being restored or retrieved. The previous cumulative size of the change log may indicate a size of the change log prior to the respective log segment. The lineage of the log segment may indicate parent or child partitions associated with the log segment.

The backup and log manager 120 may monitor the database service 110 to determine whether or not a split has occurred. In some embodiments, the backup and log manager 120 may read or monitor a log stream in order to track split events. The change log or log segment for the database may be partitioned or split in response to the split of the given database partition corresponding to the change log. In some embodiments, the change log or corresponding log segment may be split. For example, the change log 142 may be split into two or more child change logs and stored to the log store 140 as new data structures having separate log streams. The child change logs may correspond to the two or more child partitions that were created when the given database partition was split. In other embodiments, the change log may be duplicated and split into the two or more child change logs. In yet other embodiments, the two or more child change logs may be newly created in response to the split of the given partition.

After splitting the change log or the log segment for the given partition, the database service 110 may track the two or more child change logs as being dependent from the change log of the given partition. In some embodiments, the given partition may have a reference counter that indicates a quantity of dependent child partitions that depend from the change log for the given partition. In some embodiments, when the child partitions are created, the reference counter for the given partition may be incremented by the number of the child partitions. For example, if two child partitions are created when the given partition is split, the reference counter for the given partition is increased by two. The reference counter may improve computational efficiency by providing a single point of data to determine the number of child partitions that depend from the change log for the given partition. The reference counter may be referred to faster than traversing the data store 120 to iteratively determine whether the child partitions depend from the change log or have corresponding full snapshots.

The log segment may be added to the change log 142 at the log store 140 in response to satisfying one or more criteria. In some embodiments, the log segment may be added to the change log based on a determination that the log segment satisfies a size threshold. For example, the database service 110 may add events to the log segment continuously until the log segment reaches a specified size or a size limit. After the log segment is the specified size, the log segment may be committed to the change log 142 at the log store 140. In other embodiments, the log segment may be added to the change log based on a determination that a number of operations tracked or identified in the log segment satisfies a threshold number of operations. For example, the database service 110 may perform multiple CHANGE operations to the database. The multiple CHANGE operations on a data entry may require a higher amount of storage space in the log segment despite the storage space used by the data entry has not significantly increased. The database service 110 may track a number of operations and corresponding types and save the number of operations and corresponding types to the log segment.

The database service 110 may receive an indication that an event has occurred with a partition of a given database managed by the database service 110. In some embodiments, the event may be based on a request to perform an operation sent from a given client 150 to the database service 110. For example, the event may be based on a PUT command, a CHANGE command, a DELETE command or any other type of request from the given client 150. The event may also indicate a type of the operation, such as PUT, CHANGE, DELETE, etc. The event may also indicate data that used to perform the operation. For example, the indicated data may include new data to be stored with the PUT command, changed data to be updated with the CHANGE command, data to be deleted with the DELETE command.

The database service 110 may generate a log segment based on the event. For example, the database service 110 may tabulate or track one or more changes resulting from the event and save them to the log segment. The database service 110 may track a size of the log segment. In some embodiments, the database service 110 may track a size of the change log. The database service 110 may retrieve metadata from an end log segment of the change log to identify a cumulative size for the change log. The database service 110 may determine a new cumulative size of the change log based on adding the tracked size of the log segment with the identified cumulative size of the change log. The new cumulative size may be included in metadata for the log segment. In some embodiments, the log segment may be sent or committed to the change log 142 at the log store 140 based on satisfying a log segment size threshold. For example, the log segment may be committed to the change log after reaching a maximum size limit.

The clients 150 may send a request to the database service 110 to generate a backup of a partition of a database 124. The database service 110 may also implement timed, periodic backups automatically or after scheduling by the clients 150. In some embodiments, a backup of the partition the database (e.g., a snapshot) may be generated at least in part by the backup and log manager 120. The backup and log manager 120 may have access to the database partitions 114 stored at the database service 110, the data store 130 and the log store 140.

The backup and log manager 120 may determine whether to generate the snapshot based on a log size for the change log 142 at the log store 140 satisfying a size threshold. For example, the backup and log manager 120 may determine to generate the snapshot when the change log reaches a size limit such that the change log reaches a maximum allowable size. The maximum allowable size may be set in order to reduce overall computation time or costs associated with maintaining the change log. The backup and log manager 120 may also determine whether to generate the snapshot in response to a request from the client 150. The backup and log manager 120 may yet also determine whether to generate the snapshot based on a timed request or a periodic schedule.

The backup and log manager 120 may calculate the size of the change log by tracking the size over time, during generation of log segments of the change log. In some embodiments, the backup and log manager 120 may store a current size of a log segment to metadata for the log segment. The backup and log manager 120 may further track a current cumulative size of the change log, including the log segment. In some embodiments, the backup and log manager 120 may iteratively traverse the change log to calculate the size of the change log.

In other embodiments, the backup and log manager 120 may examine or analyze metadata for a log segment to determine that the log segment and preceding log segments have a given size. For example, the metadata for the log segment may indicate a running sum of the size of the change log. Tracking the running sum of the size may increase subsequent size calculations by having an entry in the metadata that is easily referenced compared to traversing the change log. A first log segment may indicate a total size for the first log segment in corresponding metadata. A second log segment may indicate a cumulative size including a size for the second log segment added to the size of the first log segment. In a non-limiting example, the first log segment may have a size of 10 units, and the second log segment may have a size of 15 units, so the cumulative size in the metadata for the second log segment may be set to 25 units (i.e., the sum of 10 and 15 units). In an example, when generating a third log segment, the backup and log manager 120 may analyze the metadata for the second log segment to determine that the change log has a cumulative sum of 25 units (e.g., a previous cumulative sum). The backup and log manager 120 may then add a size of the third log segment (e.g., 20 units) to the previous cumulative sum (25 units) to calculate the current cumulative sum (45 units). The backup and log manager 120 may write the current cumulative sum to metadata for the third log segment. The backup and log manager 120 may store or commit the third log segment and corresponding metadata to the change logs 142 of the log store 140. In some embodiments, the metadata may indicate sequence numbers that represent numbers of operations that have been performed on the database. The sequence numbers may be tracked by the backup and log manager 120 as an estimate for the size of the change log, in some embodiments.

The backup and log manager 120 may reduce storage usage at the log store 140 by removing redundant or duplicate entries in log segments or the change log 142. In some situations, the change log 142 may be tracking multiple partitions that may be logged asynchronously. Some of the partitions may be duplicative of other partitions with an offset in logging. For example, partitions of the database 124 may be managed asynchronously thus causing the offset. In some embodiments, the backup and log manager 120 may determine that a log segment contains one or more portions that are also included in one or more previous log segments based on a previous cumulative size and a sequence start identifier for the log segment. For example, the log segment may have a sequence start identifier of 40, and a most recent, previous log segment may indicate that there are 45 entries already stored. The backup and log manager 120 may delete or remove entries 40-45 of the log segment to avoid duplicating logs that have already been committed to the log store 140.

The database service 110 may receive a request for a cumulative size of a range of operations. In some embodiments, the database service 110 may determine the cumulative size of the range by identifying a starting log segment corresponding to a start point of the range. For example, the range may indicate a starting sequence number that may be used to identify a log segment in the change log 142 at the log store 140. The database service 110 may analyze metadata for the starting log segment to determine a preceding cumulative size of preceding log segments. In some embodiments, the preceding cumulative size may be an entry in the metadata for the starting log segment. The database service 110 may identify an ending log segment corresponding to an end point of the range. The database service 110 may analyze metadata for the ending log segment to determine an ending cumulative size of the change log that includes the preceding log segments and the range. The database service 110 may calculate the cumulative size of the range by subtracting the preceding cumulative size from the ending cumulative size.

The backup and log manager 120 may force generation of a full snapshot of a given database partition based on one or more criteria being satisfied. In some embodiments, the criteria may include a size threshold. For example, change logs 142 or change log segments stored at the log store 140 for the given database partition may be evaluated with respect to the cumulative storage size of the change logs 142 or change log segments at the log store 140. In other embodiments, the criteria may include an age threshold. For example, the backup and log manager 120 may determine that an existing snapshot may be too old to be useful, such that a new full snapshot should be generated in order to maintain proper point-in-time restoration functionality, thus allowing the database system to improve functionality of its computer-based systems, such as database and backup management.

To generate the snapshot of a partition of the database 124, the backup and log manager 120 may determine a snapshot type or method to generate the snapshot. In some embodiments, the backup and log manager 120 may determine the snapshot type based on a log size of the change log or operation type statistics for the change log. For example, the backup and log manager 120 may determine to request a full snapshot from the database service 110 based on a determination that the change log satisfies a size threshold, such as a maximum size limit, in order to more efficiently generate the full snapshot. In other embodiments, the backup and log manager 120 may determine the snapshot type based on operation type statistics including a number of performed operation types indicated in the change log. For example, the change log may indicate a large number of CHANGE operations such that numerous modifications of data have occurred over time on the same data entries. In this example, a full snapshot may be more cost effective in terms of storage costs and computational usage costs because repeatedly modifying data with the change logs 142 may result in redundant or wasted computations by overwriting data multiple times while generating the snapshot. In another example, the change log may indicate a large number of PUT operations such that numerous new data entries are included in the change log. In this example, a log-based snapshot or a differential-based snapshot may be more cost effective because requesting a full snapshot from the database service 120 may cause the database service 120 to provide data that has not significantly changed in addition to the new data entries. In another example, the operation type statistics may include a relative percentage of performed operation types that is relative to other performed operation types. As another example, the operation type statistics may include a ratio of performed operation types that is relative to other performed operation types. In yet another example, the operation type statistics may include a percentage of performed operation types as a percentage of the cumulative size of the change log.

The backup and log manager 120 may determine that the snapshot type is a full snapshot to generate a full snapshot based on a current state of the partition(s) of the database as it stored at the database service 110. In some embodiments, the snapshot may be stored as complete data of the partition (s). The backup and log manager 120 may send a request to the database service 110 for the full snapshot. The database service 110 may provide and send the full snapshot to the backup and log manager 120. The backup and log manager 120 may store the full snapshot to the snapshots 132 of the data store 130.

In another example, the backup and log manager 120 may determine that the snapshot type is a log-based snapshot. The backup and log manager 120 may generate data that indicates a point in the change log that, when used in conjunction with a stored snapshot, may be used to represent a snapshot of the partition of the database 124. The backup and log manager 120 may store the generated data as metadata in the data store 130.

In some embodiments, the log-based snapshot may be used to generate a full snapshot based on applying at least a portion the change log to a stored snapshot 132. The log-based snapshot may indicate the portion of the change log that may include logged events that have occurred since generation of the stored snapshot 132 through the current time. The backup and log manager 120 may retrieve the stored snapshot 132 from the data store 130, such as by sending a request to the data store 130 for the previous snapshot 132. The backup and log manager 120 may retrieve the change log 142 from the log store 140, such as by sending a request to the log store 140 for the change log 142. The backup and log manager 120 may be configured to apply the change log to the stored snapshot. In some embodiments, applying the change log to the stored snapshot includes starting with the stored snapshot and stepping through the change log and reenacting events included in the change log in chronological order to the stored snapshot. In other embodiments, applying the change log to the stored snapshot includes starting with the stored snapshot and stepping through the change log and undoing events included in the change log in reverse chronological order.

After generating the full snapshot or the complete snapshot, the backup and log manager 120 may indicate the snapshotted partition no longer depends from any predecessor or parent partitions of the snapshotted partition. In some embodiments, the snapshotted partition may be a child partition of one or more parent partitions. For example, by taking a full snapshot of the snapshotted partition, portions of the change log for the one or more parent partitions may not be needed to perform point-in-time restorations for the snapshotted partition. In some embodiments, the backup and log manager 120 may adjust or modify a reference counter for the parent partitions to indicate that the snapshotted partition is no longer dependent on the portion of the change log for the parent partitions. For example, the backup and log manager 120 may decrement the reference counter for the parent partitions. In some embodiments, the reference counter may be tracked in a lineage dependency table 112. For example, the database service 110 may store and manage the lineage dependency table 112 separately from the change log and stored backups or snapshots. In some embodiments, the backup and log manager 120 may traverse a lineage dependency table 112 for the snapshotted partition to identify each parent partition for the snapshotted partition. For example, the backup and log manager 120 may iteratively traverse the lineage dependency table 112 by starting at the snapshotted partition and iteratively identifying predecessor or parent partitions in the lineage dependency table 112 and decrementing respective reference counters by one (1) to indicate that one fewer partition (e.g., the snapshotted partition) is no longer dependent on the portion of the change log for the respective partition.

The backup and log manager 120 may determine that a portion of the change log 142 for a given partition of a database 124 may be deleted or removed from the log store 140. The deletion or removal may be a part of a garbage collection routine, according to some embodiments. In some embodiments, the portion of the change log may be deleted based on a determination that the portion of the change log is no longer needed for a point-in-time restoration of the given partition. For example, the determination that the portion is no longer needed may be based on whether snapshots for each child partition of the given partition have been saved. In some embodiments, a reference counter may be used to track a quantity of child partitions which do not have saved snapshots. For example, the reference counter may be maintained in the lineage dependency table 112 at the database service 110. In another example, the determination that the portion is no longer needed may be based on whether a retention window has elapsed for the given partition. In some embodiments, snapshots for the child partitions must be made within the retention window before the portion of the change log may be deleted.

In some situations, the portion of the change log may be older than the retention window, while a second portion of the change log may be within the retention window. The portion of the change log outside of the retention window may be deleted, while the second portion is not deleted. In some embodiments, the portion may be retained until the change log, as a whole, is older than the retention window. In other embodiments, the portion may be archived until the change log may be deleted.

Figure 2:
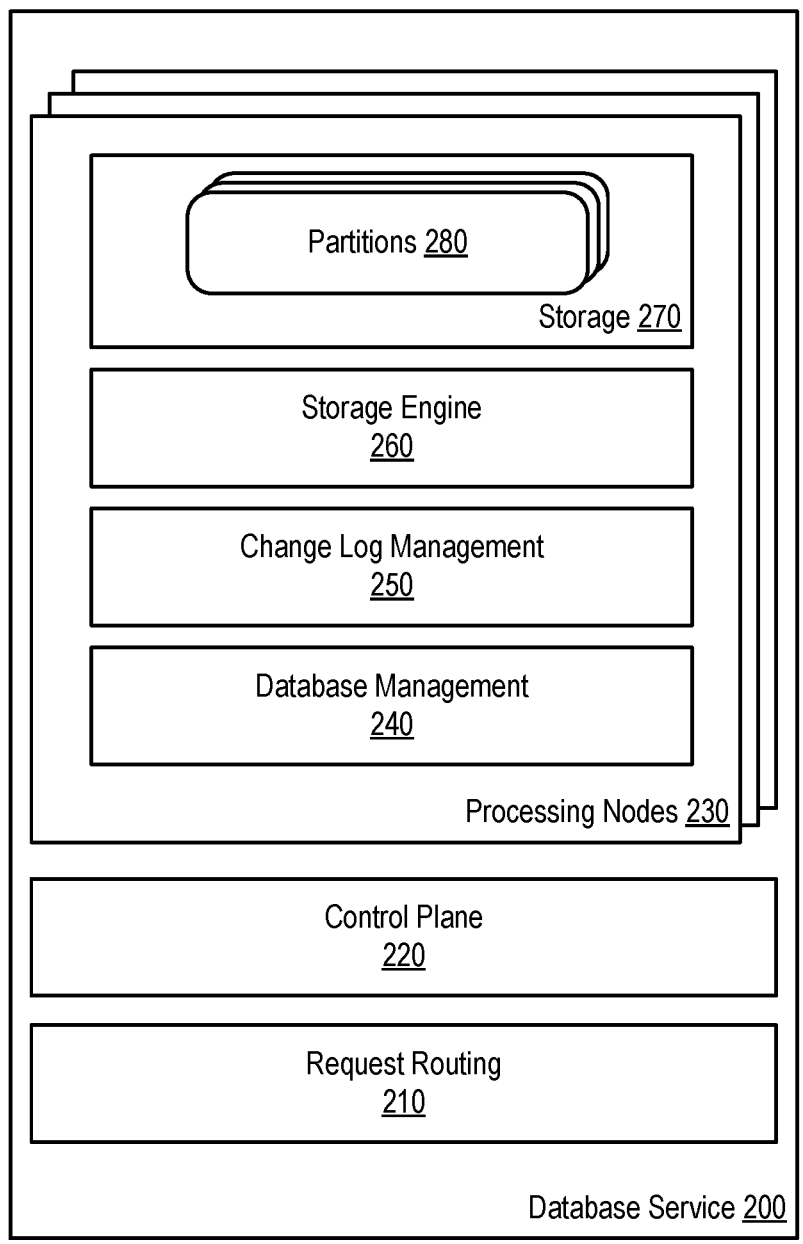
FIG. 2 is a logical block diagram illustrating a database service that may implement database backup management, according to some embodiments.

FIG. 2 is a logical block diagram illustrating a database service that may implement database backup management, according to some embodiments. Database service 200 may correspond to the database service 110 of FIG. 1. Database service 200 may implement request routing 210, in one embodiment. Request routing may be configured to receive, authenticate, parse, throttle and/or dispatch service requests, among other things, in one embodiment. In one embodiment, database service 200 may implement control plane 220 to implement one or more administrative components, such as automated admin instances which may be configured to provide a variety of visibility and/or control functions, as described in more detail herein). In one embodiment, database service 200 may also implement a plurality of database nodes 230, each of which may manage one or more partitions 280 of a data set (e.g., a database) on behalf of clients/users or on behalf of the data storage service (and its underlying system) which may be stored in internal storage 270 (on storage devices attached to database nodes 230) or, in another embodiment, one or more partitions 290 in external storage 280 which may be accessed by database nodes 230 (e.g., via network connections).

In one embodiment, request routing 210 may support handling requests formatted according to an interface to support different types of web services requests. For example, in one embodiments, database service 200 may be configured to implement a particular web services application programming interface (API) that supports a variety of operations on tables (or other data objects) that are maintained and managed on behalf of clients/users by the data storage service system (and/or data stored in those tables). In one embodiment, database service 200 may be configured to support different types of web services requests. For example, in one embodiments, database service 200 may be configured to implement a particular web services application programming interface (API) that supports a variety of operations on tables (or other data objects) that are maintained and managed on behalf of clients/users by the data storage service system (and/or data stored in those tables). In one embodiment, request routing 210 may perform parsing and/or throttling of service requests, authentication and/or metering of service requests, dispatching service requests, and/or maintaining a partition assignments that map database nodes to partitions.

Control plane 220 may provide visibility and control to system administrators, detect partition or split events for database nodes, and/or anomaly control, resource allocation, in one embodiment. In one embodiment, control plane 220 may also include an admin console, through which system administrators may interact with the data storage service (and/or the underlying system). In one embodiment, the admin console may be the primary point of visibility and control for the data storage service (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as split requests to be processed, at storage service 270, in one embodiment.

Control plane 220 may be configured to direct the performance of different types of control plane operations among the nodes, systems, or devices implementing database service 200, in one embodiment. For instance, control plane 220 may be configured to communicate with database nodes to initiate the performance of various control plane operations, such as moves, splits, update tables, delete tables, create indexes, etc. In one embodiment, control plane 220 may be configured to update a task registry (or some other table or data structure) with the status, state, or performance information of the control plane operations currently being performed. Control plane 220 may detect, direct, or otherwise instigate different partition movement operations.

Database nodes 230 may implement database management 240, in one embodiment.

Database management 240 may create, update, define, query, and/or otherwise administer databases, in one embodiment. For instance, database management 240 may maintain a database according to a database model (e.g., a relational or non-relational database model). In one embodiment, database management 240 may allow a client to manage data definitions (e.g., Data Definition Language (DDL) requests to describe column definitions, requests to add item attributes, etc.). In one embodiment, database management 240 may handle requests to access the data (e.g., to insert, modify, add, or delete data as well as requests to query for data by generating query execution plans to determine which partitions of a database may need to be evaluated or searched in order to service the query). In one embodiment, database management 240 may also perform other management functions, such as enforcing access controls or permissions, concurrency control, or recovery operations. In one embodiment, database management 240 may send requests to storage engine 260 to access partitions 280 in order to process access requests (e.g., requests to read or scan different partitions or particular items or parts of data within a partition).

Database nodes 230 may implement change log management 250, in some embodiments. Change log management 250 may create, update, define, query, and/or otherwise administer change logs associated with databases, according to some embodiments. In some embodiments, change log management 250 may track events occurring at a database managed by the database service 220. For example, change log management 250 may generate change logs based on the events and send the change logs to a storage service (e.g., the log store 140 of FIG. 1). Change log management 250 may monitor changes at storage engine 260 and generate change logs per partition of partitions 280.

In one embodiment, database nodes 230 may implement storage engine 260 to access either internal storage and/or external storage 270. Storage engine 260 may perform requests on behalf of database management to create, read, update and delete (CRUD) data in a partition, in one embodiment. Storage engine 260 may implement buffers, caches, or other storage components to reduce the number of times storage is accessed, in one embodiment. Storage engine 260 may implement various storage interfaces to access storage 270. For example, in those embodiments where external storage is a network-based data storage service, like another data storage service in provider network 100 in FIG. 1, then storage engine 260 may be configured to establish a network connection with the service as part of obtaining access to a storage unit (e.g., by submit requests formatted according to a protocol or API to establish the connection). In another embodiment, storage engine 260 may access internal storage using storage protocols (e.g., Small Computer Systems Interface (SCSI)) over a bus or other interconnect that directly connects a host implementing storage engine 260 with internal storage 270).

In one embodiment, database service 200 may provide functionality for creating, accessing, and/or managing tables processed at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 2. Note also that in one embodiment, one or more database nodes 230 process access requests on behalf of clients directed to tables. Some of these database nodes may operate as if they were in a multi-tenant environment, and others may operate as if they were in a single-tenant environment. In some embodiments, database nodes 230 that operate as in a multi-tenant environment may be implemented on different database nodes (or on different virtual machines executing on a single host) than database nodes that operate as in a single-tenant environment. In some embodiments, database nodes 230 may operate as a stand-alone database environment.

Figure 3A:
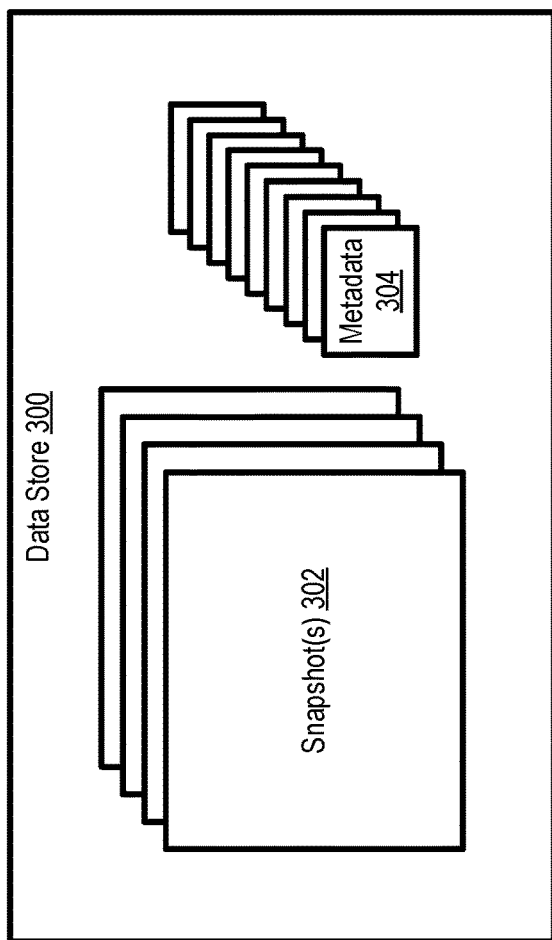
FIG. 3a is a block diagram illustrating a data store configured to store snapshots of databases, according to some embodiments.

FIG. 3a is a block diagram illustrating a data store configured to store snapshots of databases, according to some embodiments. A data store 300 may store snapshots 302 for a database managed by the database service 110 of FIG. 1 or the database service 200 of FIG. 2. The data store 300 may correspond to the data store 130 of FIG. 1. The snapshots 302 may correspond to the snapshots 132 of FIG. 1.

The snapshots 302 may include full snapshots of partitions of the database such that all data of partitions of the database at a point-in-time is kept as a backup in the snapshots 302. The data store 300 may also store metadata 304 for log-based snapshots. For example, the metadata 304 may identify one or more portions of a change log 142 at the log store 140 of FIG. 1. The metadata 304 may indicate points in the change log that, when combined with a snapshot 302, may assist in generation of a new snapshot. In some embodiments, the metadata 304 may identify points-in-time corresponding to a sequence number for events that occurred at the database. The metadata 304 may be generated by a database service to improve data access times to backup data stored at the data store 300.

Figure 3B:
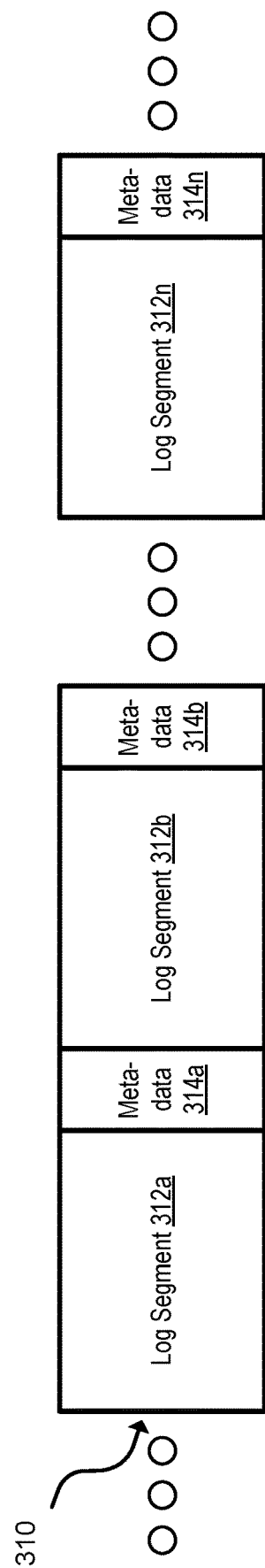
FIG. 3b is a block diagram illustrating a change log, according to some embodiments.

FIG. 3b is a block diagram illustrating a change log, according to some embodiments. A change log 310 may be stored at or retrieved from the log store 140 of FIG. 1. The log segments 312a, 312b . . . 312n may be generated by a backup and log manager 120 or a database service 110. The log segments 312a, 312b . . . 312n may store logs that correspond to operations performed on a database managed by a database service.

The change log 310 may include metadata 314a, 314b . . . 314n that is associated with respective log segments 312a, 312b . . . 312n. For example, metadata 314a may indicate a size of log segment 312a. Metadata 314b may indicate a cumulative size of log segment 314b and log segment 312a. Metadata 314n may indicate a cumulative size of log segment 312a, 314b and any other log segments generated between log segment 314b and 314n. Metadata 314a, 314b . . . 314n may also indicate a sequence start identifier, a sequence end identifier, a time start identifier, a time end identifier, one or more checksums, a previous cumulative size of the change log, a lineage of the new log segment, or any combination thereof, for respective log segments 312a, 312b . . . 312n.

Figure 4:
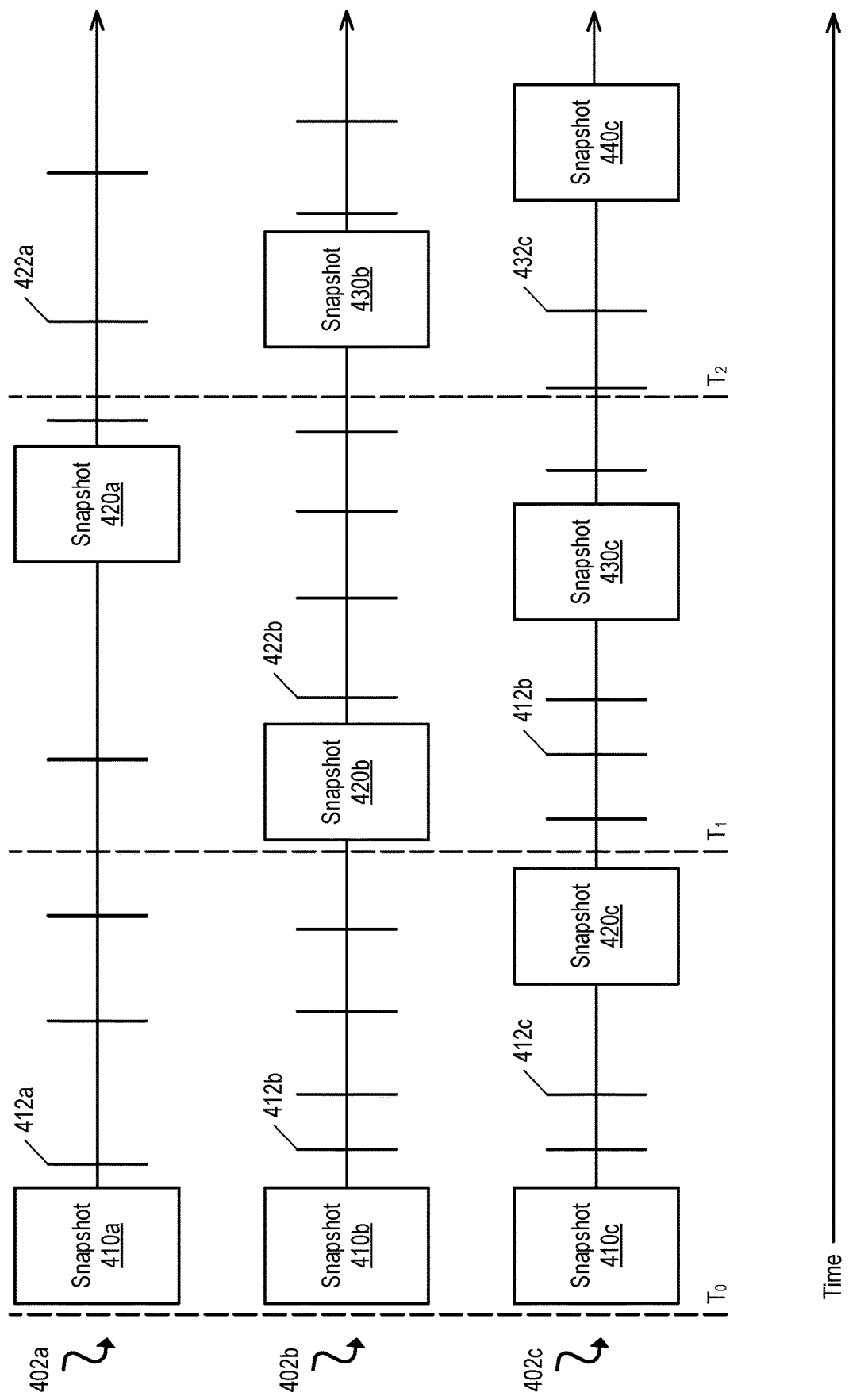
FIG. 4 is a timeline diagram illustrating snapshots and log-based snapshots over time, according to some embodiments.

FIG. 4 is a timeline diagram illustrating snapshots and log-based snapshots over time for multiple partitions of a database service, according to some embodiments. Timelines 402a, 402b and 402c are intended to be examples and non-limiting. The timelines 402a, 402b and 402c may correspond to different partitions of database service. The database service may correspond to the database service 110 of FIG. 1 or the database service 200 of FIG. 2.

As an illustrative example, at $T_0$, snapshots 410a, 410b and 410c may be generated from respective partitions of the database, as described herein. As events occur at respective partitions, one or more log-based snapshots 412a, 412b and 412c are generated by a backup manager (e.g., the backup and log manager 120 of FIG. 1), as described herein. A second snapshots 420a, 420b and 420c may be generated based on retrieving a full snapshot from the database service or based on applying change logs to respective previous snapshots 410a, 410b and 410c, as described herein. The second snapshots 420a, 420b and 420c may also have corresponding log-based snapshots 422a, 422b and 422c. As additional events occur, additional snapshots 430b and 440c may be generated.

A client may request a point-in-time restoration of a snapshot. For example, the client may request a restoration for time $T_1$. For the partitions represented by timelines 402a and 402b, the database service may retrieve a most recent log-based snapshots 412a and 412b closest to $T_1$. For the partition represented by timeline 402c, the database service may retrieve snapshot 420c. In some embodiments, the database service may retrieve a previous snapshot and apply at least a portion of the change log to achieve more precision in the state of the partition at the point-of-time. For example, the database service may have access to a log-based snapshot 412a that may be generated one or more events prior to the requested time $T_1$. Thus, the database service may apply a portion of the change log that includes events occurring between the preceding log-based snapshot and $T_1$.

A client may also request a backup be performed at $T_2$. The backup manager may determine whether to apply change logs to stored snapshots or generate a full snapshot from the database service, as described herein. As an illustrative example, for the partition represented by timeline 402a, the backup manager may determine to generate a log-based backup based in part on $T_2$ being relatively close in time to generation of the snapshot 420a. As another illustrative example, for the partition represented by 402b, the backup manager may determine to generate a full backup based in part on the change log since generation of the snapshot 420b being relative large or satisfying a size threshold.

Figures 5A, 5B:
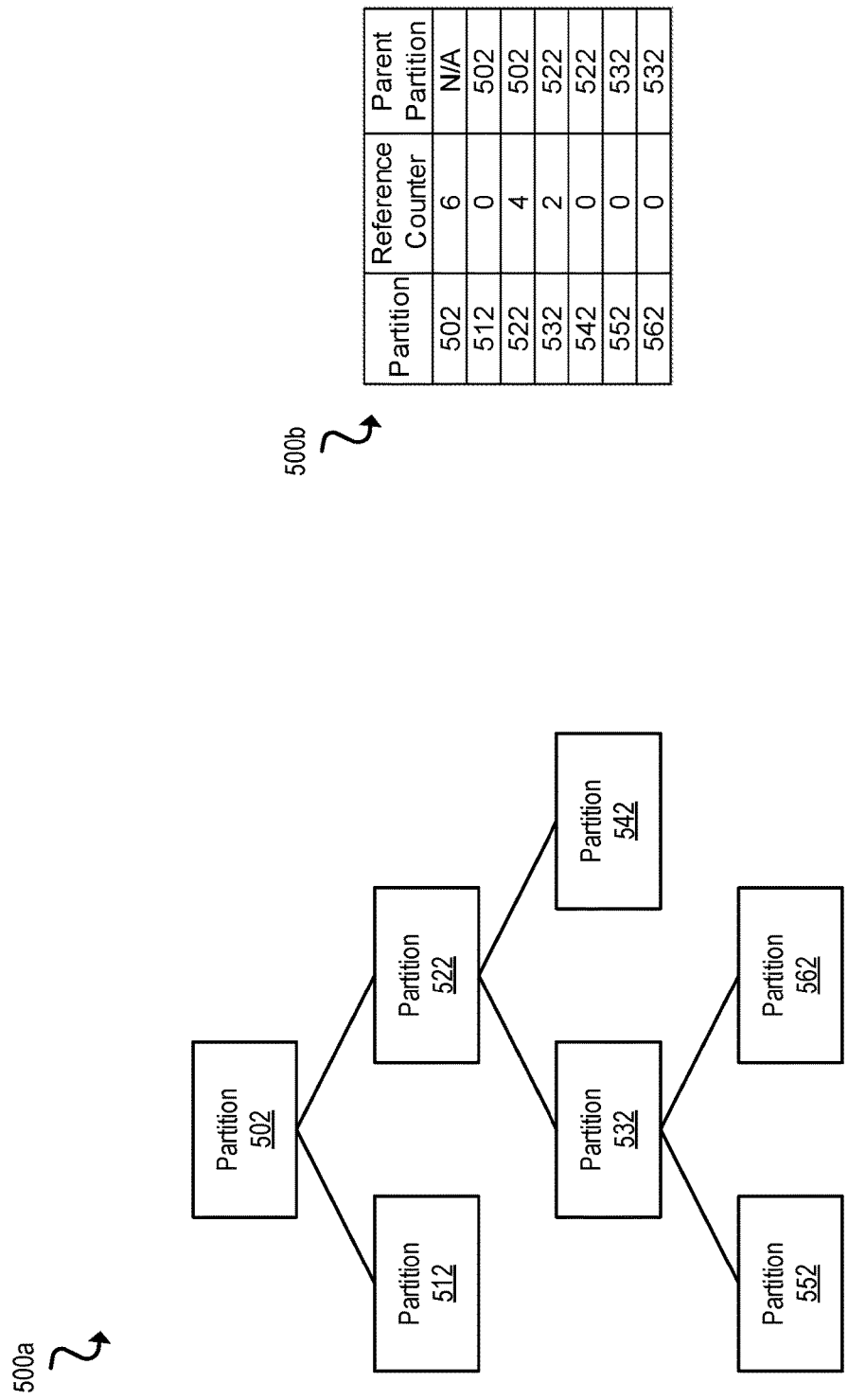
FIG. 5a is a representation of a lineage tree for a plurality of partitions for a database, according to some embodiments.
FIG. 5b is a table illustrating a lineage dependency table for the plurality of partitions for the database, according to some embodiments.

FIG. 5a illustrates a representation of a lineage tree 500a for a plurality of partitions for a database, according to some embodiments. The lineage tree 500a may be maintained as part of the lineage dependency table 112 of FIG. 1. The plurality of partitions may correspond to partitions 280 of FIG. 2. As an illustrative example, the plurality of partitions may include partitions 502, 512, 522, 532, 542, 552 and 562. In the illustrated example of FIG. 5a, partition 502 is split into two child partitions: partitions 512 and 522. Partition 522 is split into partitions 532 and 542. Partition 532 is split into partitions 552 and 562. In other embodiments, partitions may be split into two or more child partitions.

Each partition has a corresponding reference counter indicating a quantity of dependent partitions for the respective partition. In some embodiments, the reference counter may indicate the number of dependent partitions where the respective change log for the respective partition is depended on by a child partition for a point-in-time restore during a retention window. In the example illustrated in FIG. 5a, assume no full snapshots have been taken for any of the partitions 502, 512, 522, 532, 542, 552 and 562. Thus, a change log for a given partition is dependent on a corresponding parent change log of a parent partition of the given partition. For example, the change logs for partitions 552 and 562 are dependent on the change log for partition 532. Therefore, because two (2) partitions are dependent on partition 532, a reference counter for partition 532 indicates a value of two (2) as a count of partitions 552 and 562.

The reference counters and parent partitions may be indicated in a lineage dependency table, such as linage dependency table 500b illustrated in FIG. 5b. In some embodiments, the lineage dependency table 500b may indicate, for the plurality of partitions, respective reference counters and identifiers for parent partitions.

Partitions 512, 542, 552 and 562 do not have any child partitions in the illustrated example of FIG. 5a. Accordingly, respective reference counters stored in the linage dependency table 500b indicate a value of zero (0) to represent that zero (0) child partitions depend on the partitions 512, 542, 552 and 562, respectively. Although partitions 512, 542, 552 and 562 do not have any dependencies, partitions 512, 542, 552 and 562 may be dependent on respective parent partitions if snapshots for partitions 512, 542, 552 and 562 have not occurred within the retention window.

In some embodiments, when partitions are split into child partitions, the respective counters are incremented for any predecessor partition for the child partitions. For example, the reference counter for partition 502a is incremented from zero (0) to two (2) when partition 502 splits into partitions 512 and 522. When partition 522 splits into partitions 532 and 542, the reference counter for partition 522 is incremented from zero (0) to two (2), and the reference counter for partition 502 is incremented from two (2) to four (4). When partition 532 splits into partitions 552 and 562, the reference counter for partition 532 is incremented from zero (0) to two (2), the reference counter for partition 522 is incremented from two (2) to four (4), and the reference counter for partition 502 is incremented from four (4) to six (6).

Figures 6A, 6B:
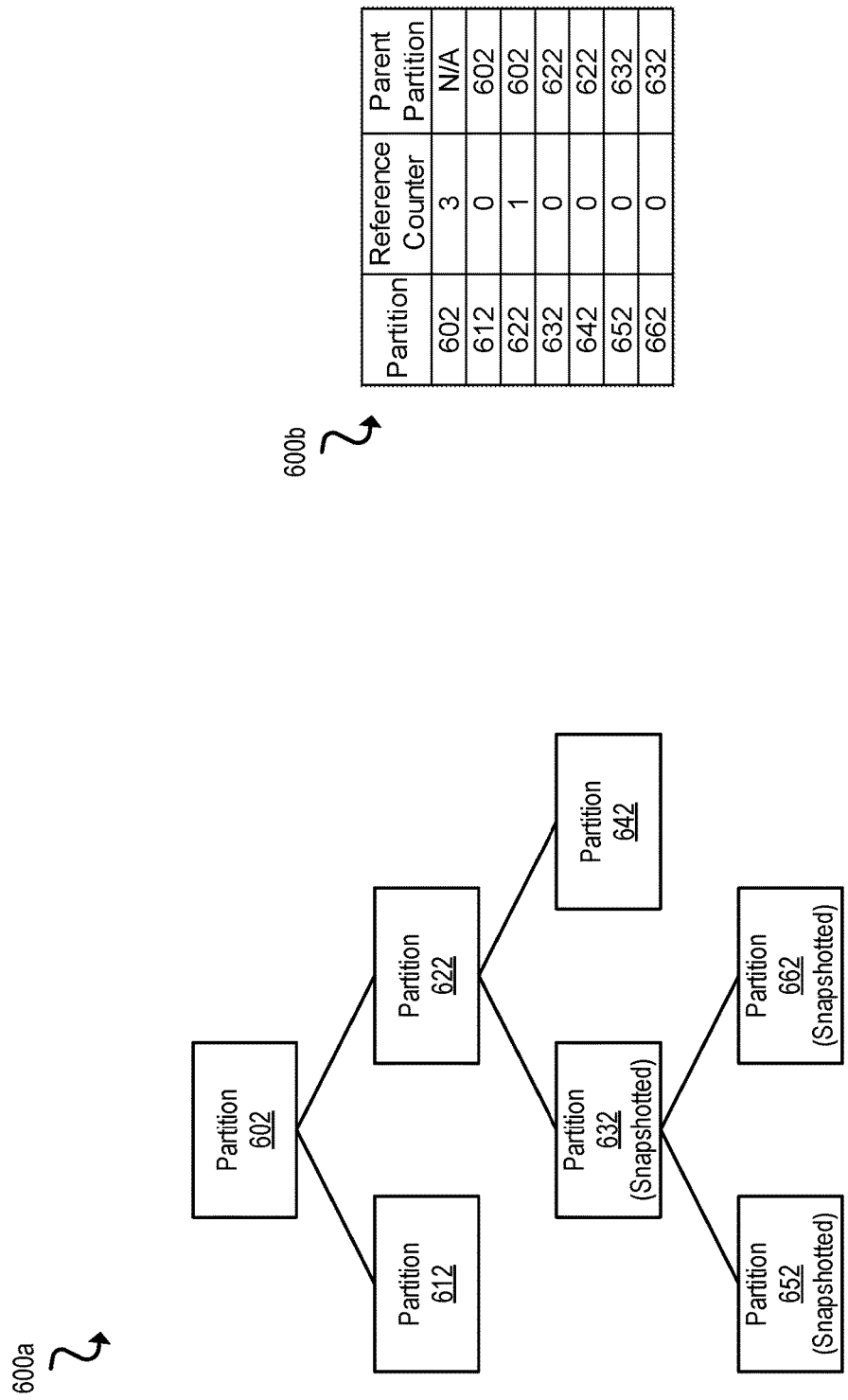
FIG. 6a is a representation of a lineage tree for a plurality of partitions for a database after snapshots have been taken for at least some of the plurality of partitions, according to some embodiments.
FIG. 6b is a table illustrating a lineage dependency table for the plurality of partitions for the database after snapshots have been taken for at least some of the plurality of partitions, according to some embodiments.

FIG. 6a illustrates a representation of a lineage tree 600a for a plurality of partitions for a database after snapshots have been taken for at least some of the plurality of partitions, according to some embodiments. In some embodiments, the snapshots may be captured and generated with respect to FIGS. 3 and 4. In an illustrative example, the lineage tree 600a represents the lineage tree 500a after snapshots are saved for partitions 532, 552 and 562. Partitions 632, 652 and 662 indicate that snapshots have saved each of the partitions 632, 652 and 662. In some embodiments, the indications may be stored as metadata for the partitions 632, 652 and 662. In other embodiments, the indications may be stored in a table for the lineage tree 600a, such as lineage dependency table 600b. In some embodiments, the indications may include timestamps that identify when the snapshots were taken. In some embodiments, the timestamps may be used to determine whether the snapshots were taken within the retention window.

As snapshots are taken for partitions within the retention window, respective counters for parent partitions of the snapshotted partitions may be decremented to indicate that one fewer partition is dependent on the parent partitions. As an illustrative example, assume counters start with the values indicated in FIG. 5a. When a full snapshot is saved for partition 652, the reference counter for partition 632 is decremented from two (2) to one (1), the reference counter for partition 622 is decremented from four (4) to three (3), and the reference counter for partition 602 is decremented from six (6) to five (5). When a full snapshot is saved for partition 662, the reference counter for partition 632 is decremented from one (1) to zero (0), the reference counter for partition 622 is decremented from three (3) to two (2), and the reference counter for partition 602 is decremented from five (5) to four (4). When a full snapshot is saved for partition 632, the reference counter for partition 622 is decremented from two (2) to one (1), and the reference counter 602 is decremented from four (4) to three (3).

In some embodiments, a change log corresponding to partition 632 may be deleted based on a determination that the reference counter for partition 632 is equal to zero (0), as described with respect to FIG. 1. In other embodiments, the change log corresponding to partition 632 may be deleted based on both the reference counter for partition 632 being equal to zero (0) and the retention window elapsing.

Figure 7:
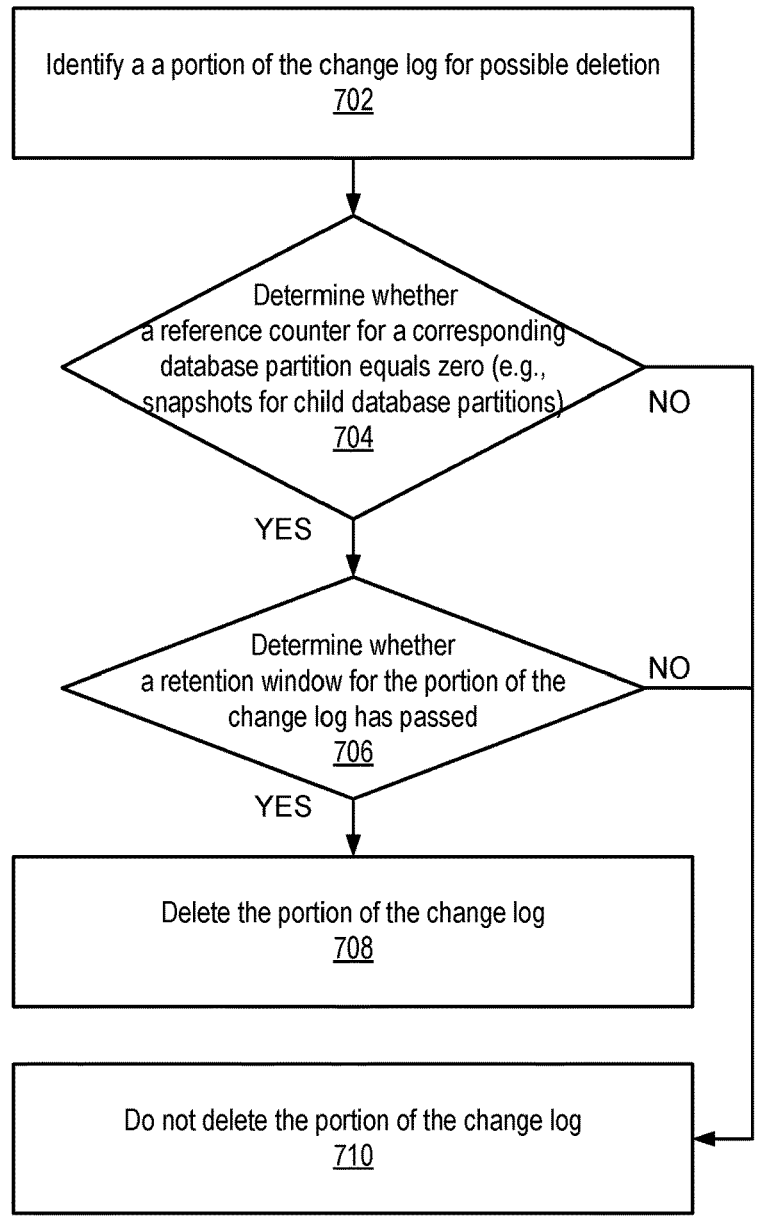
FIG. 7 is a flowchart diagram illustrating a method of deleting at least a portion of a change log for a database partition, according to some embodiments.

FIG. 7 is a flowchart diagram illustrating a method 700 for deleting at least a portion of a change log for a database partition, according to some embodiments. In some embodiments, the method 700 may be performed at the backup and log manager 120 of FIG. 1.

The method 700 includes identifying a portion of a change log for possible deletion, at 702. In some embodiments, the portion of the change log may have a corresponding database partition may correspond to at least one partition of the partitions 280 of FIG. 2. In some embodiments, the change log may be stored as the change log 142 at the log store 140 of FIG. 1. In some embodiments, the change log may be generated by the database service 110 of FIG. 1 or change log management 250 of FIG. 2. In other embodiments, the change log may be generated by the backup and log manager 120 of FIG. 1. In some embodiments, the changes may include a create, read, update or delete operation performed on data in the database partition.

The method 700 further includes determining whether a reference counter for a corresponding database partition equals zero, at 704. The reference counter may indicate a quantity of child change logs or child database partitions that depend from the portion of the change log for the database partition. Based on a determination that the reference counter is nonzero, the method 700 may proceed to 710, where the method 700 terminates by not deleting the portion of the change log. In some embodiments, a determination as to whether the reference counter equals zero may be based on whether each child database partition has a stored complete or full snapshot. In some embodiments, a determination as to whether each child database partition has a stored complete or full snapshot may be made based at least in part on traversing the data store to determine whether snapshots have been stored. For example, the database service 110 or the backup and log manager 120 may scan the data store 130 to determine whether or not the complete snapshot 132 has been stored. Based on a determination that a complete snapshot is stored for each child database partition, the method 700 may continue to 706.

The method 700 also includes determining whether a retention window for the portion of the change log has passed, at 706. Based on a determination that the retention window for the portion of the change log has not passed, the method 700 may proceed to 710, where the method 700 terminates by not deleting the portion of the change log. In some embodiments, the database service may have a retention window corresponding to a time period in which a point-in-time restoration of the database partition is available. For example, the retention window may be a time period defined by a service level agreement which defines the time period in which the database partition may be restorable to a particular point-in-time. In other embodiments, the retention window may be a fixed time period in which the backup and log manager 120 may be capable in maintaining the change log. For example, the log store 140 may be configured to maintain change logs 140 for the database for a fixed duration of time. Based on a determination that the retention window has elapsed, the method 700 continues onto 708. In some embodiments, steps 704 and 706 may be performed in succession in any order. In other embodiments, steps 704 and 706 may be performed concurrently or in parallel. For example, steps 704 and 706 may be evaluated independently although the method 700 may refrain from continuing to 708 until both 704 and 706 are satisfied.

The method 700 concludes by deleting the portion of the change log, at 708. In some embodiments, the backup and log manager may send an instruction to the log store, such as the log store 140, to delete at least a portion of the change log. For example, the log store may be configured to delete the portion of the change log that is older than the retention window. In other embodiments, the portion of the change log may correspond to the database partition, where the change log, as a whole, may correlate to all database partitions for the database.

The method 700 also concludes by not deleting the portion of the change log, at 710, in response to a determination that the reference counter is nonzero or a determination that the retention window has not elapsed.

Figure 8:
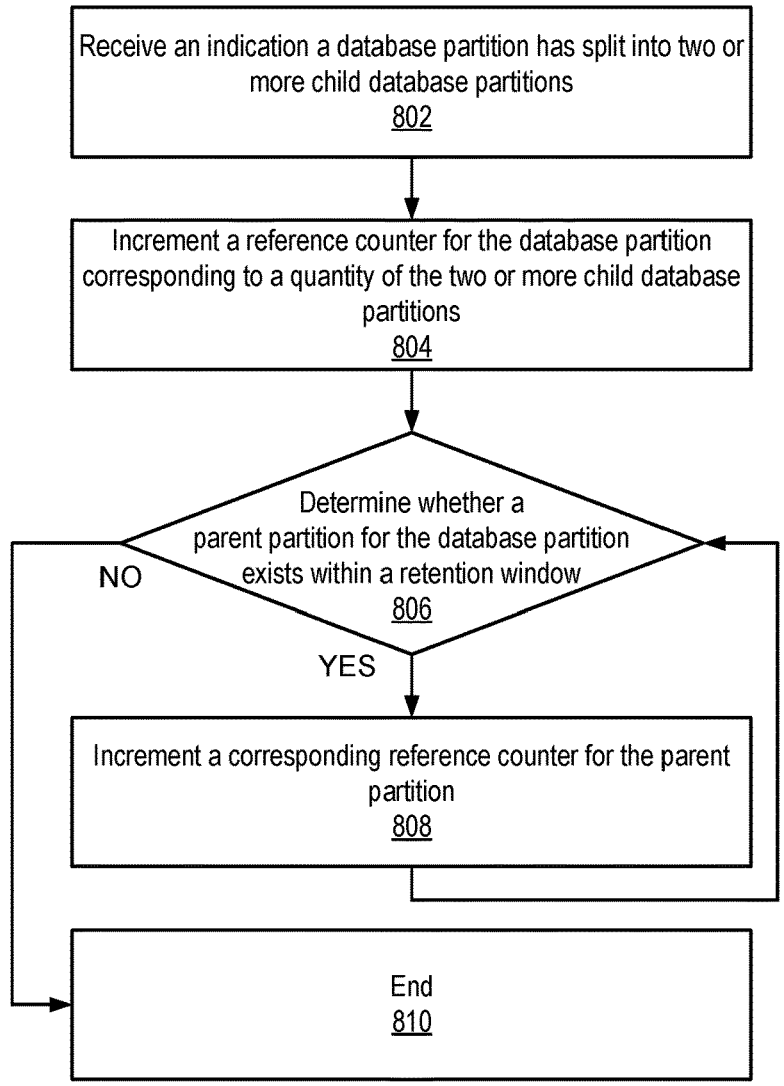
FIG. 8 is a flowchart diagram that illustrates a method for tracking dependencies for change logs of database partitions, according to some embodiments.

FIG. 8 is a flowchart diagram that illustrates a method 800 for tracking dependencies for change logs of database partitions, according to some embodiments. In some embodiments, the method 800 may be performed by the backup and log manager 120 of FIG. 1.

The method 800 includes receiving an indication a database partition has split into two or more child database partitions, at 802. The backup and log manager may receive the indication that the database partition has split as a notification from storage 270 or storage engine 260 of FIG. 2. In some embodiments, the backup and log manager may monitor a log stream to determine whether the split has occurred. In some embodiments, the split may be caused or directed by control plane 220, database management 240 or storage engine 260 of FIG. 2.

The method 800 also includes incrementing a reference counter for the database partition corresponding to a quantity of the two or more child database partitions, at 804. In some embodiments, the reference counter may be managed by the database service 110 as described with respect to FIGS. 5a, 5b, 6a and 6b. For example, the lineage tree may correspond to the lineage tree 500a of FIG. 5a or the lineage tree 600a of FIG. 6a. In other embodiments, the lineage tree may correspond to a lineage dependency table. For example, the lineage dependency table may correspond to the lineage dependency table 112 of FIG. 1, the lineage dependency table 500b of FIG. 5b or the lineage dependency table 600b of FIG. 6b. In some embodiments, the reference counter may be managed by the database service 110. For example, the reference counter may be maintained in a lineage tree generated and managed by the database service. In other embodiments, the reference counter may be managed by database management 240. For example, the database service 200 may include database management 240 configured to generate the lineage tree to store the reference counter. In yet other embodiments, the reference counter may be stored in metadata for the database partition.

The method 800 further includes determining whether another parent partition for the database partition exists within a retention window, at 806. The database service may identify the parent partition based on a lineage tree maintained by the database service. In some embodiments, the parent partition may be identified by analyzing the linage tree to identify which partition of partitions 280 was split in forming of the database partition. For example, the lineage tree may include information identifying respective parent partitions for given partitions of the partitions for the database. In some embodiments, the lineage dependency table may have a reference to additional predecessor or parent partitions for the database partition. For example, the lineage dependency table may indicate a hierarchy of the partitions of the database in order to track which partitions depend on other partitions. In some embodiments, the database service may traverse parent information stored in metadata for the database partition which may identify the parent partition. Based on a determination that another parent partition is found and has not already had a respective reference counter modified, the method 800 may continue to 808 to further increment respective reference counters for the parent partitions of the database partition. Based on a determination that no other parent partitions are found for the database partition, the method 800 may conclude at 810.

The method 800 also includes incrementing a corresponding reference counter for the parent partition, at 808. The reference counter may be incremented by a quantity of the two or more child database partitions. For example, the reference counter may be incremented by one for each of the two or more child database partitions that have been created as a result of the split. In some embodiments, the reference counter may be maintained as part of the lineage tree, as described with respect to FIGS. 5a, 5b, 6a and 6b. For example, the reference counter may be stored as data included in the lineage tree. In other embodiments, the reference counter may be stored as metadata for the parent partition. For example, a metadata store for the partitions may store relevant metadata, including the reference counter. The method 800 returns to 806.

The method 800 concludes, at 810, when no additional parent database partitions exist for the database partition that was split.

Figure 9:
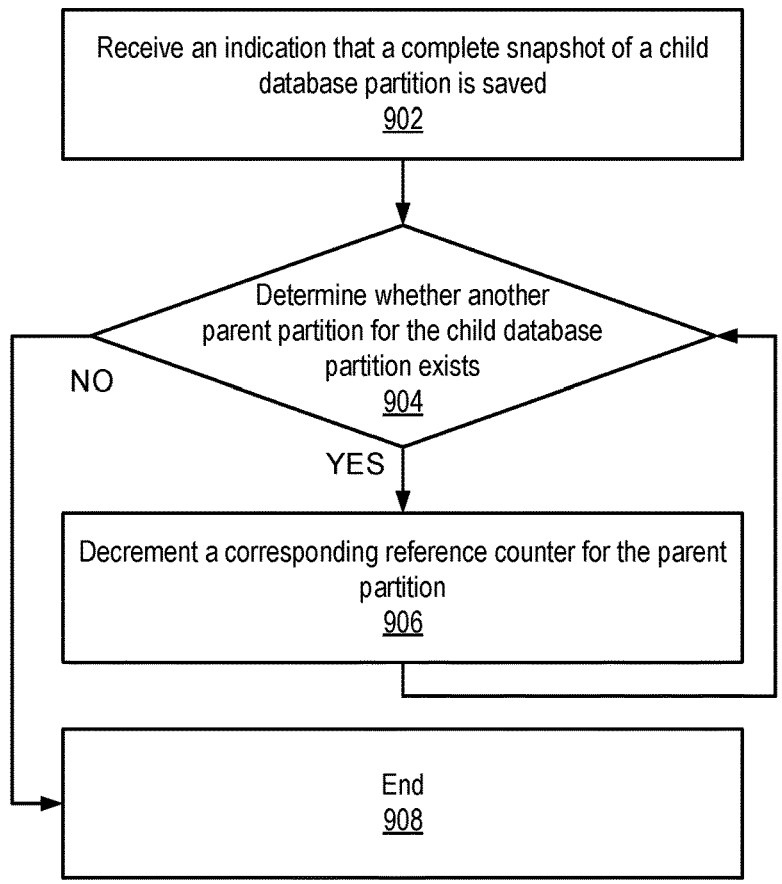
FIG. 9 is a flowchart diagram that illustrates a method for tracking dependencies for change logs of database partitions, according to some embodiments

FIG. 9 is a flowchart diagram illustrating a method 900 for tracking dependencies for change logs of database partitions, according to some embodiments. In some embodiments, the method 900 may be performed by the database service 110 of FIG. 1, database management 240 or change log management 250 of FIG. 2.

The method 900 includes receiving an indication that a complete snapshot of a database partition is saved, at 902. In some embodiments, the complete snapshot may be generated by the database service 110. For example, the complete snapshot or the full snapshot may be generated by determining a current state of the child database partition as it is stored in the database service 110 or storage 270. In other embodiments, the complete snapshot may be generated using one or more change logs 142 stored in the log store 140. For example, a previous snapshot 132 may be retrieved from a data store (e.g., data store 130 of FIG. 1), and one or more change logs 142 from the log store 140 may be applied to the previous snapshot, as described herein.

The method 900 also includes determining whether another parent partition for the database partition exists, at 904. The database service may identify the parent partition based on a lineage dependency table maintained by the database service. For example, the lineage dependency table may correspond to the lineage dependency table 500b of FIG. 5b or the lineage dependency table 600b of FIG. 6b. In some embodiments, the parent partition may be identified by analyzing the linage dependency table to identify which partition of partitions 280 was split in forming of the database partition. For example, the lineage dependency table may include information identifying respective parent partitions for given partitions of the partitions for the database. In some embodiments, the lineage dependency table may have a reference to additional predecessor or parent partitions for the database partition. For example, the lineage dependency table may indicate a hierarchy of the partitions of the database in order to track which partitions depend on other partitions. In some embodiments, the database service may traverse parent information stored in metadata for the database partition which may identify the parent partition. Based on a determination that another parent partition is found, the method 900 may continue to 906 to further decrement respective reference counters for parent partitions of the database partition. Based on a determination that no other parent partitions are found for the database partition, the method 900 may conclude at 908.

The method 900 further includes decrementing a corresponding reference counter for the parent partition, at 906. The reference counter may be decremented based on the database partition having a complete snapshot saved. For example, the reference counter may be decremented by one for each database partition that has had a complete snapshot saved. In some embodiments, the reference counter may be maintained as part of the lineage dependency table, as described with respect to FIGS. 5a, 5b, 6a and 6b. For example, the reference counter may be stored as data included in the lineage dependency table. In other embodiments, the reference counter may be stored as metadata for the parent partition. For example, a metadata store for the partitions may store relevant metadata, including the reference counter. The method 900 returns to 904.

The method 900 also concludes, at 908, when no additional parent partitions for the child database have reference counters that have yet to be modified.

Figure 10:
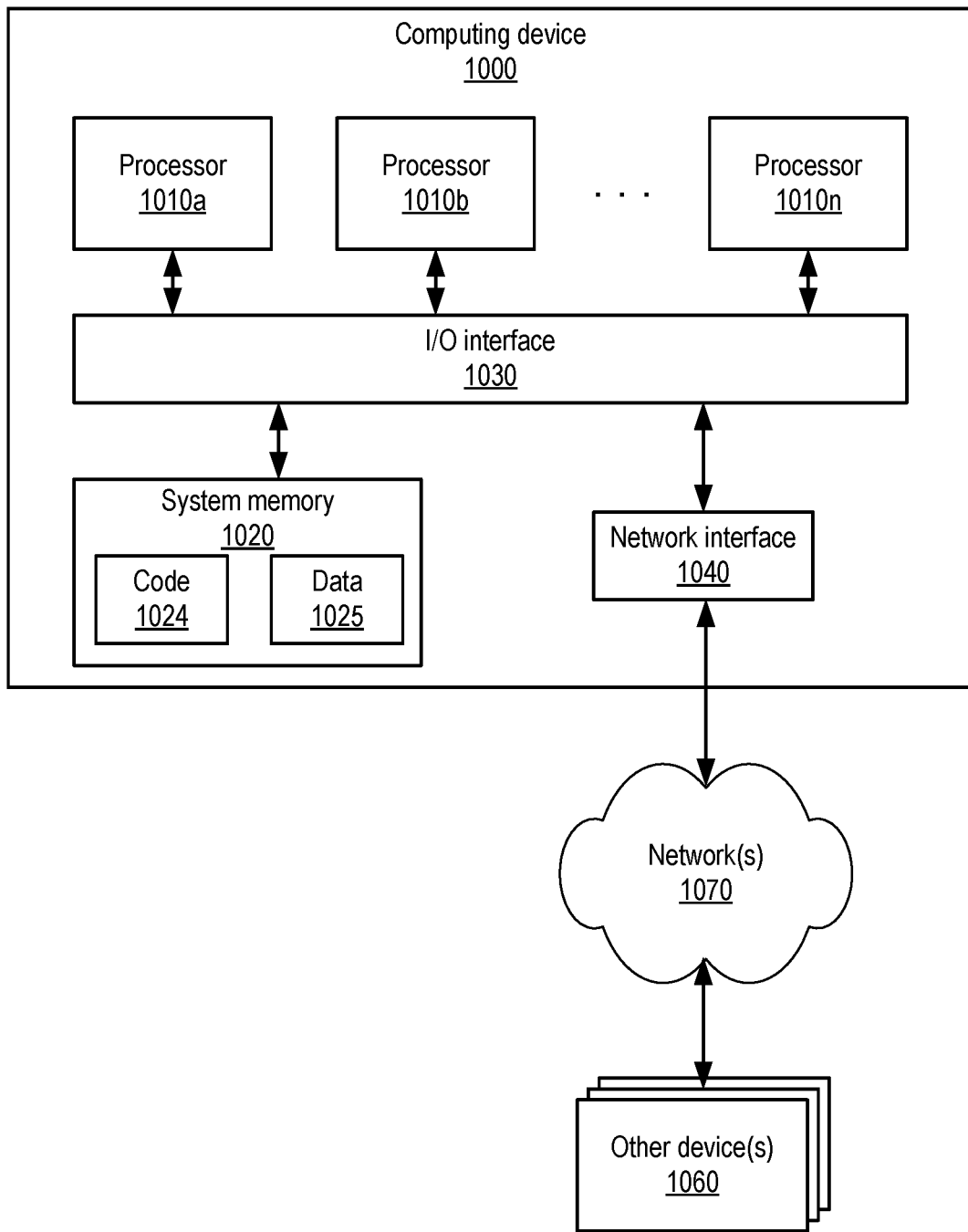
FIG. 10 is a block diagram illustrating an example computer system that may be used in some embodiments.

Any of various computer systems may be configured to implement techniques for tracking a count of a quantity of items in a data store, as disclosed herein. For example, FIG. 10 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 1000 such as that illustrated in FIG. 10 or one or more components of the computer system 1000 that function in a same or similar way as described for the computer system 1000.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In some embodiments, computer system 1000 may be illustrative of servers implementing enterprise logic or downloadable application, while in other embodiments servers may include more, fewer, or different elements than computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be embedded processors implementing any of a variety of instruction set architectures (ISAs), such as the x106, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor 1010. In various embodiments, system memory 1020 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the tracking of a count of a quantity of items in a data store are shown stored within system memory 1020 as program instructions 1024. In some embodiments, system memory 1020 may include data 1025 which may be configured as described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as between client devices (e.g., 1060, clients 150, etc.) and other computer systems, or among hosts, for example. In particular, network interface 1040 may be configured to allow communication between computer system 1000 and/or various other device 1060 (e.g., I/O devices). Other devices 1060 may include scanning devices, display devices, input devices and/or other communication devices, as described herein. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1000 via I/O interface 1030. A computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, which may be implemented via network interface 1040.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 1000, including one or more processors 1010 and various other devices (though in some embodiments, a computer system 1000 implementing an I/O device 1050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1000. In general, an I/O device (e.g., cursor control device, keyboard, or display(s) may be any device that can communicate with elements of computing system 1000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   a database service comprising a plurality of database partitions to store a database;
   a log store to store a plurality of change logs corresponding to the plurality of database partitions for the database;
   one or more computing devices and comprising one or more processors and a memory, the memory storing instructions that, when executed by the one or more processors, cause the one or more processors to:
   receive an indication that a split of a database partition of the plurality of database partitions into two or more child database partitions has occurred;
   split, responsive to the split of the database partition, a change log for the database partition into two or more corresponding child change logs, wherein the two or more child change logs are stored to the log store;
   identify a portion of the change log based at least on the two or more child change logs depending from the portion of the change log;
   determine whether a respective complete snapshot has been stored for each of the two or more child database partitions corresponding to the two or more child change logs; and delete the portion of the change log responsive to a determination that the respective complete snapshots have been stored for each of the two or more child database partitions and a determination that the retention window for the portion of the change log has passed.

2. The system of claim 1, wherein the instructions further cause the one or more processors to:
store a lineage dependency table for the plurality of database partitions, wherein the lineage dependency table comprises respective reference counters for respective database partitions of the plurality of database partitions, and wherein each reference counter of the respective reference counters indicate, for a respective database partition, a quantity of child database partitions that do not have a full snapshot stored.

3. The system of claim 2, wherein to perform the determination that the respective complete snapshot is stored for each child database partition, the instructions further cause the one or more processors to evaluate the reference counter for the database partition.

4. The system of claim 2, wherein the instructions further cause the one or more processors to:
traverse the lineage dependency table to identify one or more parent database partitions of the database partition; and
increase, in response to the split of the change log, the respective reference counters for the database partition and the one or more parent database partitions by a quantity of the two or more child database partitions.

5. The system of claim 2, wherein the instructions further cause the one or more processors to:
traverse the lineage dependency table to identify one or more parent database partitions of the database partition; and
in response to an indication that a complete snapshot is stored for a child partition of the database partition, decrease the respective reference counters for the database partition and the one or more parent database partitions.

6. A method, comprising:
storing a change log for a database partition, wherein the change log indicates changes made to the database partition;
splitting, responsive to a split of the database partition into two or more child database partitions, the change log into two or more corresponding child change logs;
identifying a portion of the change log based at least on the two or more child change logs depending from the portion of the change log;
determining whether a complete snapshot has been stored for each of the two or more child database partitions corresponding to the two or more child change logs; and
deleting the portion of the change log responsive to a determination that the complete snapshots have been stored for each of the two or more child database partitions and a determination that the retention window for the portion of the change log has passed.

7. The method of claim 6, further comprising:
storing a lineage dependency table for the plurality of database partitions, wherein the lineage dependency table comprises respective reference counters for respective database partitions of the plurality of database partitions, and wherein each reference counter of the respective reference counters indicate, for a respective database partition, a quantity of child database partitions that do not have a full snapshot stored.

8. The method of claim 7, further comprising:
evaluating the reference counter for the database partition to determine whether a complete snapshot is stored for each child database partition.

9. The method of claim 7, further comprising:
traversing the lineage dependency table to identify one or more parent database partitions of the database partition.

10. The method of claim 9, further comprising:
incrementing, in response to the split of the change log, the respective reference counters for the database partition and the one or more parent database partitions by a quantity of the two or more child database partitions.

11. The method of claim 9, further comprising:
receiving an indication that a complete snapshot is stored for a child partition of the database partition; and
based at least in part on the complete snapshot being stored for the child partition, decrementing the respective reference counters for the database partition and the one or more parent database partitions.

12. The method of claim 6, wherein the retention window corresponds to a time period in which a point-in-time restore for the database partition is available.

13. A non-transitory, computer readable storage medium storing instructions that, when executed by one or more processors, cause the one or more processors to:
store a change log for a database partition, wherein the change log indicates changes made to the database partition;
split, responsive to a split of the database partition into two or more child database partitions, the change log into two or more corresponding child change logs;
identify a portion of the change log based at least on the two or more child change logs depending from the portion of the change log;
determine whether a complete snapshot has been stored for each of the two or more child database partitions corresponding to the two or more child change logs; and
delete the portion of the change log responsive to a determination that the complete snapshots have been stored for each of the two or more child database partitions and a determination that the retention window for the portion of the change log has passed.

14. The non-transitory, computer readable storage medium of claim 13, wherein the instructions further cause the one or more processors to:
store a lineage dependency table for the plurality of database partitions, wherein the lineage dependency table comprises respective reference counters for respective database partitions of the plurality of database partitions, and wherein each reference counter of the respective reference counters indicate, for a respective database partition, a quantity of child database partitions that do not have a full snapshot stored.

15. The non-transitory, computer readable storage medium of claim 14, wherein perform the determination that the respective complete snapshot is stored for each child database partition, the instructions further cause the one or more processors to evaluate the reference counter for the database partition.

16. The non-transitory, computer readable storage medium of claim 14, wherein the instructions further cause the one or more processors to:

traverse the lineage dependency table to identify one or more parent database partitions of the database partition; and based at least in part on the split of the change log, increase the respective reference counters for the database partition and the one or more parent database partitions.

17. The non-transitory, computer readable storage medium of claim 14, wherein the instructions further cause the one or more processors to:

traverse the lineage dependency table to identify one or more parent database partitions of the database partition; and based at least in part on an indication that a complete snapshot is stored for a child partition of the database partition, decrement the respective reference counters for the database partition and the one or more parent database partitions.

18. The non-transitory, computer readable storage medium of claim 13, wherein the instructions further cause the one or more processors to:

determine whether a size of a child change log for a child database partition of the two or more child database partitions satisfies a size threshold; and based at least in part on a determination that the size of the child change log satisfies the size threshold, generate a complete snapshot for the corresponding child database partition.

19. The non-transitory, computer readable storage medium of claim 13, wherein the instructions further cause the one or more processors to:

determine whether a complete snapshot for a child database partition of the two or more child database partitions satisfies an age threshold; and based at least in part on a determination that the complete snapshot for the child database partition satisfies the age threshold, generate a new complete snapshot for the corresponding child database partition.

20. The non-transitory, computer readable storage medium of claim 13, wherein the instructions further cause the one or more processors to:

store, to a log store, the two or more child change logs as new data structures.

* * * * *